(12) United States Patent
Thakur et al.

(10) Patent No.: US 12,380,066 B2
(45) Date of Patent: Aug. 5, 2025

(54) SYSTEM AND METHOD FOR SELECTING INSTRUMENTATION TECHNIQUE

(71) Applicant: RapidFort, Inc., Sunnyvale, CA (US)

(72) Inventors: Rajeev Thakur, Sunnyvale, CA (US); Mehran Farimani, San Francisco, CA (US); Chien-Hung Chen, Tainan (TW)

(73) Assignee: RapidFort, Inc., Sunnyvale, CA (US)

( * ) Notice: Subject to any disclaimer, the term of this patent is extended or adjusted under 35 U.S.C. 154(b) by 0 days.

(21) Appl. No.: 18/806,152

(22) Filed: Aug. 15, 2024

(65) Prior Publication Data

US 2025/0068599 A1 Feb. 27, 2025

Related U.S. Application Data

(60) Provisional application No. 63/534,397, filed on Aug. 24, 2023.

(51) Int. Cl.
*G06F 16/16* (2019.01)
*G06F 11/362* (2025.01)
(Continued)

(52) U.S. Cl.
CPC ........ *G06F 16/164* (2019.01); *G06F 11/3644* (2013.01); *G06F 16/1734* (2019.01); *G06F 16/18* (2019.01); *G06F 2221/2137* (2013.01)

(58) Field of Classification Search
CPC .... G06F 16/18; G06F 16/164; G06F 16/1734; G06F 16/1844; G06F 16/21; G06F 16/5838
(Continued)

(56) References Cited

U.S. PATENT DOCUMENTS 6,285,995 B1 * 9/2001 Abdel-Mottaleb .......................... G06F 16/5838
707/999.002
10,042,947 B2 8/2018 Lin
(Continued)

FOREIGN PATENT DOCUMENTS

| CN | 112699082 A | 4/2021 |
| CN | 114697440 A | 7/2022 |

(Continued)

OTHER PUBLICATIONS

Kubernetes. "Dynamic admission control." Retrieved from https://kubernetes.io/docs/reference/access-authn-authz/extensible-admission-controllers/ on Jul. 27, 2023, 23 pp.
(Continued)

*Primary Examiner* — Shahid A Alam
(74) *Attorney, Agent, or Firm* — Young Basile Hanlon & MacFarlane, P.C.

(57) ABSTRACT

A computing environment determines whether one or more file systems associated with an application allow for modification of a file access time of an associated file and whether a kernel updates, in at least one case, the file access time upon accessing the associated file. The associated file is at least one file managed by the one or more file systems. The computing environment determines files accessed by the application using a technique selected based on whether the one or more file systems allow for modification of the file access time or whether the kernel updates, in the at least one case, the file access time upon accessing the associated file. The computing environment provides an output representing the files accessed by the application.

24 Claims, 7 Drawing Sheets

(51) Int. Cl.
G06F 16/17 (2019.01)
G06F 16/18 (2019.01)

(58) Field of Classification Search
USPC .......................................... 707/626, 654, 822
See application file for complete search history.

(56) References Cited

U.S. PATENT DOCUMENTS

| | | | |
|---|---|---|---|
| 10,073,969 | B1 | 9/2018 | Faibish et al. |
| 11,360,871 | B1 | 6/2022 | Farimani et al. |
| 2005/0278278 | A1 | 12/2005 | Petev et al. |
| 2006/0101413 | A1 | 5/2006 | Kinno et al. |
| 2011/0231458 | A1 | 9/2011 | Sutoh et al. |
| 2014/0188808 | A1* | 7/2014 | Wolf ................. G06F 16/21 707/654 |
| 2014/0380414 | A1 | 12/2014 | Saidi et al. |
| 2016/0019224 | A1 | 1/2016 | Ahn et al. |
| 2016/0124990 | A1* | 5/2016 | Suggs ............... G06F 16/1844 707/626 |
| 2016/0283198 | A1* | 9/2016 | Walker .............. G06F 9/44505 |
| 2017/0031939 | A1 | 2/2017 | Wenzel |
| 2018/0032423 | A1 | 2/2018 | Bull et al. |
| 2019/0087596 | A1 | 3/2019 | Lin |
| 2020/0125731 | A1 | 4/2020 | Benameur et al. |
| 2021/0026949 | A1 | 1/2021 | Korotaev |
| 2021/0042638 | A1 | 2/2021 | Novotny |
| 2021/0075794 | A1 | 3/2021 | Gazit et al. |
| 2024/0086558 | A1 | 3/2024 | Jadhav et al. |
| 2024/0396974 | A1 | 11/2024 | Tiagi |

FOREIGN PATENT DOCUMENTS

| | | |
|---|---|---|
| CN | 115567634 A | 1/2023 |
| CN | 116016292 A | 4/2023 |
| CN | 116431578 A | 7/2023 |
| WO | 2024226189 A1 | 10/2024 |

OTHER PUBLICATIONS

Wikipedia contributors. "Berkeley packet filter." Wikipedia, The Free Encyclopedia. Retrieved from https://en.wikipedia.org/w/index.php?title=Berkeley_Packet_Filter&oldid=1131815251 on Jul. 22, 2023, 5 pp.

Kubernetes, "Namespaces," Retrieved from https://kubernetes.io/docs/concepts/overview/working-with-objects/namespaces/ on Jul. 22, 2023, 3 pp.

GitHub. "Bolinfest / opensnoop—native." Retrieved from https://github.com/bolinfest/opensnoop-native on Jul. 18, 2023, 3 pp.

Gregg, Brendan. "Opensnoop for Linux." Brendan Gregg's Blog. Jul. 25, 2014. Retrieved from https://www.brendangregg.com/blog/2014-07-25/opensnoop-for-linux.html on Jul. 18, 2023, 4 pp.

Kubernetes, "Deployments," Retrieved from https://kubernetes.io/docs/concepts/workloads/controllers/deployment/ on Jul. 15, 2023, 25 pp.

"What is a Kubernetes manifest?" Stack Overflow. Retrieved from https://stackoverflow.com/questions/55130795/what-is-a-kubernetes-manifest on Jul. 15, 2023, 2 pp.

Wikipedia contributors. "Promiscuous mode." Wikipedia, The Free Encyclopedia. Retrieved from https://en.wikipedia.org/w/index.php?title=Promiscuous_mode&oldid=1159901543 on Jul. 14, 2023, 2 pp.

Wikipedia contributors. "Transmission control protocol." Wikipedia, The Free Encyclopedia. Retrieved from https://en.wikipedia.org/w/index.php?title=Transmission_Control_Protocol&oldid=1165370425 on Jul. 14, 2023, 22 pp.

"Berkeley packet filters." IBM Documentation. Retrieved from https://www.ibm.com/docs/en/qsip/7.4?topic=queries-berkeley-packet-filters on Jul. 14, 2023, 7 pp.

Wikipedia contributors. "Webhook." Wikipedia, The Free Encyclopedia. Retrieved from https://en.wikipedia.org/w/index.php?title=Webhook&oldid=1156370320 on Jul. 14, 2023, 2 pp.

Capabilities(7)—Linux Manual Page, https://man7.org/linux/man-pages/man7/capabilities.7.html, viewed Dec. 2, 2022, 24 pages.

Containers vs VMs, https://www.redhat.com/en/topics/containers/containers-vs-vms, Published Jan. 15, 2020, viewed Feb. 21, 2023, 9 pages.

Add the SYS_PTRACE Linux Kernel Capability, https://docs.rapidfort/com/how-to/add-sys-ptrace, viewed Dec. 2, 2022, 6 pages.

Podman vs Docker: What are the differences?, https://www.imaginarycloud.com/blog/podman-vs-docker/, viewed Dec. 1, 2022, 8 pages.

Office Action cited in U.S. Appl. No. 17/103,043, dated Jan. 20, 2022, 9 pages.

International Search Report and Written Opinion issued on Jul. 15, 2024 for PCT Patent Application Serial No. PCT/US2024/019684, 10 pages.

Google Patents/Scholar search—text refined (Year: 2024).

Office Action issued for U.S. Appl. No. 18/806,141, dated Dec. 10, 2024, 16 pages.

International Search Report and Written Opinion issued on Nov. 25, 2024 for PCT Patent Application Serial No. PCT/US2024/042478, 8 pages.

International Search Report and Written Opinion issued on Nov. 26, 2024 for PCT Patent Application Serial No. PCT/US2024/042477, 8 pages.

Final Office Action issued for U.S. Appl. No. 18/806,141, dated Mar. 31, 2025, 25 pp.

Google Scholar/Patents search—text refined (Year: 2025).

\* cited by examiner

SYSTEM AND METHOD FOR SELECTING INSTRUMENTATION TECHNIQUE

PRIORITY CLAIM AND RELATED APPLICATION

This application claims priority to U.S. Provisional Patent Application No. 63/534,397, filed on Aug. 24, 2023, and titled "System and Method for Selecting Instrumentation Technique," the entirety of which is incorporated herein by reference.

This application is related to U.S. patent application Ser. No. 18/140,259, filed on Apr. 27, 2023, and titled, "Instrumentation Using Access Time Value," the entire disclosure of which is incorporated herein by reference.

TECHNICAL FIELD

Embodiments pertain to computer architecture. Some embodiments relate to selecting an instrumentation technique. Some embodiments relate to identifying a subset of processes for monitoring.

BACKGROUND

Applications that are executed in a computing environment may access files. Identifying the files that are accessed by an application may be useful, for example, in computer security to detect unusual behavior of applications. Techniques for identifying files accessed by an application may be desirable.

Monitoring all processes may be prohibitively expensive (in terms of use of computing resources). Techniques for identifying a subset of processes for monitoring may be desirable.

DETAILED DESCRIPTION

Figure 1:
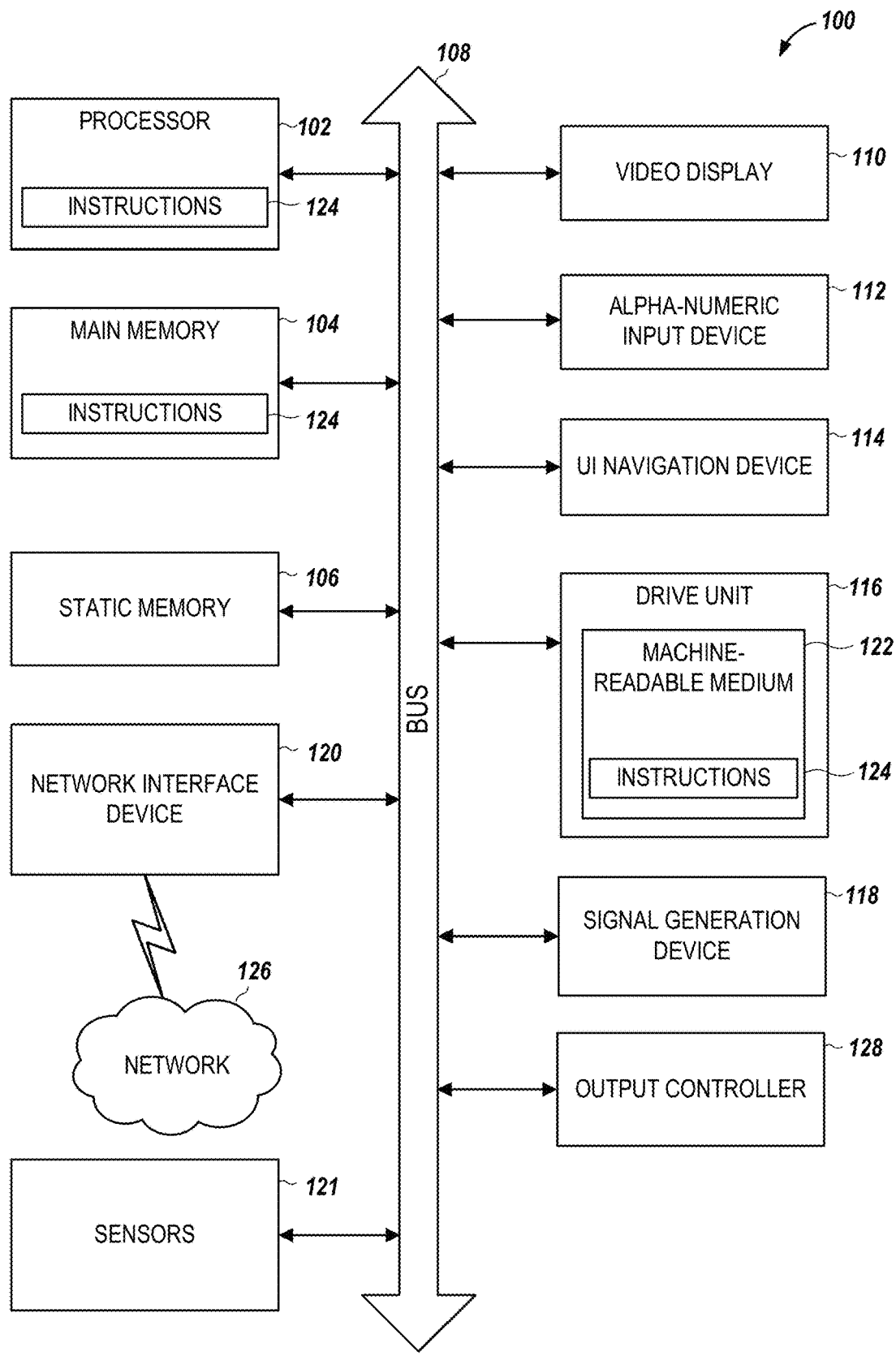
FIG. 1 is a block diagram of an example computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some implementations relate to selecting an instrumentation technique for tracking which files (and, in some cases, other computing resources) are accessed by an application. A computing environment determines whether one or more file systems associated with the application allow for modification of a file access time (atime) and whether a kernel updates the atime upon accessing the associated file. The computing environment determines files accessed by the application using a technique selected based on whether the one or more file systems allow for modification of the atime and whether a kernel updates the atime upon accessing the associated file. Specifically, if the one or more file systems allow for modification of the atime and the kernel updates the atime upon accessing the associated file, the computing environment determines the files accessed by the application based on the atime. If the one or more file systems do not allow for modification of the atime or the kernel does not update the atime upon accessing the associated file, the computing environment determines the files accessed by the application without using the atime field. The computing environment provides an output representing the files accessed by the application. This output may be used, for example, to debug the application or to increase security by limiting the ability of the application to access files that the application does not access in its typical operation. For instance, the application may be blocked from accessing files that are not represented in the output representing the files accessed by the application. In some cases, the files are outputted to a debugger for displaying, to a user, the files accessed by the application.

The one or more file systems associated with the application may include at least one of all file systems associated with the application, a root file system (rootfs), or a file system mounted on a subtree of a root file system. A root filesystem may include the particular filesystem having the mount point at the root (/), but might not include other filesystems that might be mounted as subtrees. For instrumentation purposes, some aspects use the file accesses of system utilities/libraries and executables/libraires in installed packages. These files may be installed in directories such as /bin, /sbin, /usr/bin, etc. In a container, these directories might exist in the root filesystem. However, in a VM or a physical machine, the arrangement of directories might be more complicated, and these files might span across several disks/file systems, not just in the rootfs, or may even not in the rootfs at all. Aspects of the disclosed technology may relate to containers, virtual machines, and/or physical machines, and the one or more file systems may encompass all or a subset of the file systems noted above.

Some implementations relate to identifying a group of processes meeting some criteria (e.g., belonging to the same application instance) for monitoring by a Berkeley packet filter (BPF) component. An application is managed using an application management architecture (e.g., Kubernetes, Docker, Docker Compose, Docker Swarm). A computing environment executes, upon accessing the entrypoint (e.g., the place in the application where the execution of application begins), an initialization process prior to an execution of an entry process of the application. The application transmits an identifier for a group of processes to the BPF component. The BPF component monitors the group of processes associated with the identifier.

According to some aspects, the application environment manager decides which executable to run first. This information is stored as the entrypoint directive in the configuration of the application image. The override engine can be used to direct the application environment manager to discard the entrypoint stored in the application image and use the one provided by the override engine instead. There are two methods to implement the override engine, depending on which application environment manager is in use.

The first method is to use an event notification engine provided by the application environment manager, which notifies the override engine about a new application request before acting on it. The override engine then gets a chance to change the default entrypoint. The Kubernetes's mutating webhook is such a mechanism. When available, this method may be used because it enables the implementation of override engine using the application environment manager's native feature. This method may integrate better with the application environment manager.

The second method is, instead of directly invoking the application environment manager's command to start an application, the override engine is invoked first to make necessary modification to the command-line options and/or the config file before it invokes the application environment manager's command to start an application. This method might not require the application environment manager to provide notification support, so it works more generally.

Some implementations relate to instrumentation using atime value. The access time value is stored in a field of metadata of a file and typically indicates a time when the file was accessed. If a file was not accessed, the atime may be set to an initial value. In some implementations, a computing environment identifies a subset of files which are accessed by a set of executables (e.g., from an application). The computing environment sets the atime for a set of files to the initial value. The computing environment then runs the set of executables. Upon accessing a file from the set of files by the set of executables, the kernel of the computing environment sets the atime to a new value in response to determining that at least one of the following is true: an initial access of the file is occurring, a current modification time (mtime) is younger than the access time before setting the access time to the new value, a current change time (ctime) is younger than the access time before setting the access time to the new value, or the access time before setting the access time to the new value is at least a threshold time period before a current time. The computing environment determines that the set of executables accessed a subset of files from the set of files for which the atime is different from the initial value. The computing environment provides an output representing the subset of files.

There are many situations in which it is useful to identify files that are accessed by an application. By way of example only, the techniques described herein may be used for detecting unusual, non-nominal or unexpected behavior of an application, for example to detect malicious activity, or for debugging an application. By way of example only, the techniques described herein may be used to "harden" an application by blocking access, of the application, to certain files, ports, network resources, or other computing environment resources.

According to some implementations, an instrumented application includes the set of executables. The instrumented application is an instrumentation of an original application. Setting the access time for the set of files to the initial value is accomplished by software that intercepts the instrumented application at a beginning of execution of a first executable from the set of executables. Determining that the set of executables accessed the subset of files (i.e., identifying the subset of files accessed by the set of executables) is accomplished by software that intercepts the instrumented application at an end of execution of a second executable from the set of executables.

An instrumentation may include the output of an instrumentation procedure. An instrumentation may include a stub, which provides the instrumentation functionality to the original, as well as the original itself. Instrumentation of an original (e.g., application or executable) may include generating a stub and combining the stub with the original. The output of an instrumentation procedure may include two components—the stub and the original. After instrumentation, the combination of the stub and the original takes the original's place. The input that was sent to the original is now sent to the stub. The output that was received from the original is now received from the stub. The stub may add, delete or modify the functionality of the original. In some implementations, the stub adds the functionality to perform the identification of the accessed files. The output of the instrumentation procedure could combine the stub and the original as a single object or as separate objects. Table 1 summarizes some terms related to instrumentation and non-limiting example definitions for these terms. It should be noted that the definition of any of these terms is not limited to the provided definition.

TABLE 1

| Term | Non-limiting example definition |
|---|---|
| 1 instrumentation of an executable<br>2 executable instrumentation<br>3 instrumented executable | The total output file(s) (or other data structures) of instrumentation of an executable. The output may be, for example, a single file or multiple files or other data structure(s). The content may include the stub and the original executable |
| 4 instrumentation of an application<br>5 instrumented application | The total output file(s) of instrumentation of all files which make up the application. The output file(s) may include the stubs of the file(s) and the original file(s) |
| 6 instrumentation of an application image<br>7 application image instrumentation<br>8 instrumented application image | The image file including the total output file(s) of instrumentation of all files in the application image |
| 9 original | The part of the instrumentation output that corresponds to the object(s) to which the instrumentation procedure has been applied |
| 10 stub | The part of the instrumentation output that provides functionality to the original, the functionality including accessed file identification and, in some cases, identification of accessed system calls, runtime environment variables, or network traffic |
| 11 stub of an executable<br>12 executable stub | The stub part of the output of instrumentation of an executable |
| 13 stub of an application | The stub part of the total output of instrumentation of an application |

Atime instrumentation, as disclosed herein, may make use of a file's access time timestamp, a kernel feature which records a time when a file is accessed. This timestamp is stored in a file's metadata, in some cases, along with other data, such as file size, file owner's user identifier (ID), group ID, or the like. Atime support may depend on the filesystem. Some filesystems (e.g., some Linux filesystems, such as ext2, ext3, ext4, btrfs xfs, and zfs) have a field to store access time in a file's metadata. Other filesystems (e.g., FAT32) might not support atime.

Atime support may depend on the mount option. In some implementations which use Linux operating system, if a volume is formatted in a file system with atime support, but is mounted with -noatime mount option, the kernel does not update the atime. There are other mount options (e.g., -relatime, -strictatime or -lazyatime) that may affect how often the kernel updates atime and when the update is written to the disk. In some cases, when the -strictatime mount option is used, atime may be updated every time a file is accessed. However, the -strictatime mount option may cause excessive atime update and result in performance penalty. Another mount option, -relatime, causes the kernel not to update atime if the atime has been updated recently. The -relatime mount option strikes a balance between -strictatime and -noatime. The -relatime mount option is implemented in some versions of the Linux operating system.

According to some implementations, atime instrumentation may include three main operations: initialization, instrumentation, and data collection. In the initialization operation, at the beginning of an instrumentation session (application image run), the atime of all the files in the file system (or the set of files that is of interest, which may be a portion of the files in the file system) is set to an initial value.

During the instrumentation operation, the computing environment runs the application as usual, and the kernel updates the atime of any file accessed (in some cases, subject to the file system support and mount option described above). Access may include, among other things, reading the contents of a file, or executing a file (e.g., loading a program into the memory is a file read).

During the data collection operation, the atime timestamps of all files (or the subset that is of interest) in the file system are rescanned, and the list of files whose atime have changed from the initial value is reported. The data collection operation may occur at the end of the instrumentation operation. Alternatively, the instrumentation operation may be completed over a long period of time (e.g., several months), and the data collection operation may be conducted periodically during the instrumentation operation. For example, the data collection operation may be conducted in response to a request by a user or according to a predetermined schedule (e.g., every day at 3:00 am).

The instrumentation operation may be handled, at least in part, by the kernel. The kernel may handle the atime update, including making decisions on whether to update the atime and actually performing the update. However, the kernel does not generate the list of files of which the atime values have changed. Instrumentation includes measurement. The kernel does not measure anything, but generates the events for measurement. An engine implementing the initialization operation intercepts the application image run at the beginning and an engine implementing the data collection operation intercepts the application image run at the end. The engine implementing the initialization operation and the engine implementing the data collection operation may be the same engine or different engines.

When a programmer builds an application image, the programmer may specify a default command line or a default entrypoint in the application image (i.e. the place in the application where the execution of application begins). When a user of the computing environment executes the application image without specifying, to a computing environment manager (e.g., the container manager, for example, Docker or Kubernetes) which program to run, a default command or entrypoint may be used. The user may also override the default setting by providing another command to run. The computing environment manager may then start at that command instead of following the default setting of the application image.

According to some implementations, a computing environment manager overrides an application image's default entrypoint with an instrumentation engine. This variation might not leverage generating a stub of the application image. The instrumentation engine is placed in an external volume. The computing environment then runs the original application image, but the computing environment manager mounts the external volume containing the main wrapper, then overrides the default entrypoint with the main wrapper. In other implementations, instead of mounting an external volume comprising the instrumentation engine, the instrumentation engine is added to the original application image, which remains unstubbed. The computing environment manager starts the updated image with the main wrapper as the entrypoint.

As used herein, the term "instrumentation" encompasses its plain and ordinary meaning. Instrumentation may refer to the measure of an engine's or an application's performance, in order to diagnose errors and to write trace information. Instrumentation may include identifying files accessed by an engine or an application during execution. Instrumentation of data (e.g., a file, an application or an application image) may include generating a stub of the data and the original of the data. The stub may add to the functionality of the original, delete from the functionality of the original or modify the functionality of the original. Unstubbing may refer to removing the stub and restoring the original. The term "instrumentation" or the phrase "application instrumentation" may also refer to the total output of the instrumentation process as described herein, including the original and the stub. Furthermore, the term "instrumentation" or the phrase "instrumentation operation" also encompasses the act of measurement, for example, in identifying the files that were accessed by an application.

As used herein, the term "computing environment" encompasses its plain and ordinary meaning. A computing environment may include at least one of a physical computer, a virtual machine, or a container. A computing environment may be managed by a computing environment manager, for example, a container manager (e.g., Kubernetes or Docker Swarm) or a virtual machine manager (e.g., VMware Workstation, VirtualBox, Hyper-V, Kernel-based Virtual Machine (KVM), or Xen).

As used herein, the term "application" encompasses its plain and ordinary meaning. An application may include a collection of program(s) and/or data that provide a desired functionality in a computing environment. The term "application" may refer to the functionality which the collection of program(s) and/or data provide. The term "application" may refer to the collection of program and/or data files which comprise the contents of an application image. The term "application image" may refer to a packaged file (or another data structure) comprising those contents.

As used herein, the terms "application image" or "application image file" encompass their plain and ordinary meaning. The "application image" or "application image file" may refer to an image file including a collection of program(s) and/or data that provide a desired functionality when instantiated in a computing environment.

As used herein, the phrase "stub application" refers, among other things, to an application that is constructed based on an original application. The stub may add to, delete from or modify the functionality of the original. For example, a thermometer application may access thermometer hardware to obtain a temperature reading. A stub of the thermometer application may lack access to the thermometer hardware and may simply return the value 24 Celsius (regardless of the actual temperature). As a result, the stub may be used to test the code and/or study how the code operates.

An application may include multiple executables. One instrumentation technique generates an instrumented application that includes stubs for the executables as well as the originals. The instrumented application may be intercepted with an instrumentation engine at the beginning of its execution and at the end of its execution to perform some implementations of instrumentation disclosed herein. This technique allows any of the executables to be the executable that is the first to start at the beginning of running the application and/or the executable that is the last to exit at the end of running the application. In some cases, this technique includes an unstubbing procedure which restores all instrumented executables with their originals. After unstubbing, the executables are found in their original storage locations, thereby eliminating path translation, according to some embodiments.

Another instrumentation technique instruments one executable (e.g., the main executable) of an application. In this technique, the instrumented executable is the first executable to execute at the start of the application and the last executable to execute upon exit from the application. The entry and the exit point for the instrumentation engine is in the instrumented executable. Some implementations leverage the process which is the last to exit. The instrumented executable intercepts the beginning and the end of the application image run.

An instrumented application may access a temporary instantiated storage including a storage view of a running computing environment. During unstubbing, all content items (e.g., executables) in the temporary instantiated storage (whose contents prior to unstubbing contain the stub of the application image) are made to appear in their original locations as in the original, unstubbed application image. Restoring the entire storage to the original, unstubbed, state is one of the ways to achieve this. However, as long as all executables or other content items can be found in their original locations, other instrumentation-related files may remain untouched. This may reduce or eliminate the use of path translation. When the instrumented application is instantiated in a computing environment, in some cases, the computing environment manager mounts the instrumented application image into a temporary instantiated storage and starts the entrypoint program. Therefore, prior to unstubbing, the contents of the temporary instantiated storage are, partially or fully, the files in the instrumented application image. It should be noted that the instrumented application contains both the stubs and the originals of the files in the original application image. As explained in detail below, there are different ways to arrange the stub and the original in the instrumented application. However, when running an executable using the original file path found in the original application image, it is the executable's stub that is executed. The unstubbing operation reverts this so that the original executable is executed. After unstubbing, running an executable using the original path found in the original application image causes running of the original executable.

As used herein, the term "kernel" encompasses its plain and ordinary meaning. The term "kernel" may refer to a core part of an operating system that controls and manages system resources such as the central processing unit (CPU), memory, and input/output devices. It acts as a bridge between applications and the underlying hardware, providing a layer of abstraction that allows programs to interact with the system without having to deal with the low-level details of hardware management. The kernel is responsible for managing processes, handling interrupts, managing memory, scheduling tasks, and providing a range of other essential services to the operating system and applications. It is typically loaded into memory at boot time and remains in memory throughout the system's operation. The design and implementation of a kernel can vary greatly depending on the specific operating system and its intended use case. Some kernels are monolithic, where all the essential services are provided within a single codebase, while others are microkernels, where only a minimal set of services are provided in the kernel, and other services are implemented as separate user-space processes.

An application image may include multiple executables and/or data files. In some case, the executables that are being executed are loaded into memory. When a user executes an application image, the user uses a computing environment manger to instantiate the application image, i.e., to set up an isolated computing environment to run the image. This may involve reserving system resources (e.g., memory, processing units(s), network, etc.). This may involve setting up a temporary instantiated storage and mounting the application image into the storage. Any new files or file changes are written to the temporary storage. When the computing environment terminates, the temporary data and any changes to previously existing data in the temporary data are removed. Based on the above, the computing environment has all the necessary system resources to have a process execute the application image and a temporary instantiated storage through which all files in the application image are accessible. The computing environment manager loads the entrypoint program (either the default one specified in the image, or if manual override is requested, the user specified entrypoint) and begins execution.

As used herein, a "process" may include one or more threads running an instance of one or more computer programs. A thread is a sequence of programmed instructions that can be managed independently by a scheduler, which may be a part of the operating system. Some operating systems operate multiple threads in parallel. Some operating systems operate threads serially. The one or more threads of a given process may be executed concurrently (via multithreading capabilities), sharing resources such as memory, while different processes might not share these resources.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium. For example, a computer-readable medium may include at least one of a compact disc (CD), a digital versatile/video disc (DVD), or a Blu-ray disc (BD). The CD, DVD, or BD may be at least one of read-only memory (ROM) or read-write (RW). For example, a computer-readable medium may include at least one of (1) optical discs (e.g., CD-ROM, DVD-ROM, Blu-Ray, MiniDisc, or the like) (2) magnetic disks (e.g., floppy disks, ZIP disks, or the like) (3) magneto-optical discs (MO disk, or the like) (4) memory cards (e.g., at least one of secure digital (SD) cards, MultiMediaCard (MMC) cards, CompactFlash (CF) cards, Memory Stick (MS) cards, USB flash drives, or the like; the memory cards can be read-only or read/writeable) (5) ROM cartridges, or (6) magnetic tapes (e.g., cassette tapes, reel tapes, digital audio tapes (DAT), linear tape-open (LTO) tapes, or the like). In some examples, a computer-readable medium includes circuitry to connect to the computer through a peripheral interface (e.g., at least one of universal asynchronous receiver/transmitter (UART), Institute of Electrical and Electronics Engineers (IEEE) 1284, parallel advanced technology attachment (PATA), serial advanced technology attachment (SATA), universal serial bus (USB), Institute of Electrical and Electronics Engineers (IEEE) 1394, small computer systems interface (SCSI), or the like), in order to cause the computer to read the computer-readable medium. In some examples, the computer-readable medium (e.g., an optical disc or a magnetic disc) lacks circuitry to connect to the computer. In some examples, the computer includes at least one of a peripheral interface, a driver, a software interface, or a hardware interface for reading the computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Figure 2:
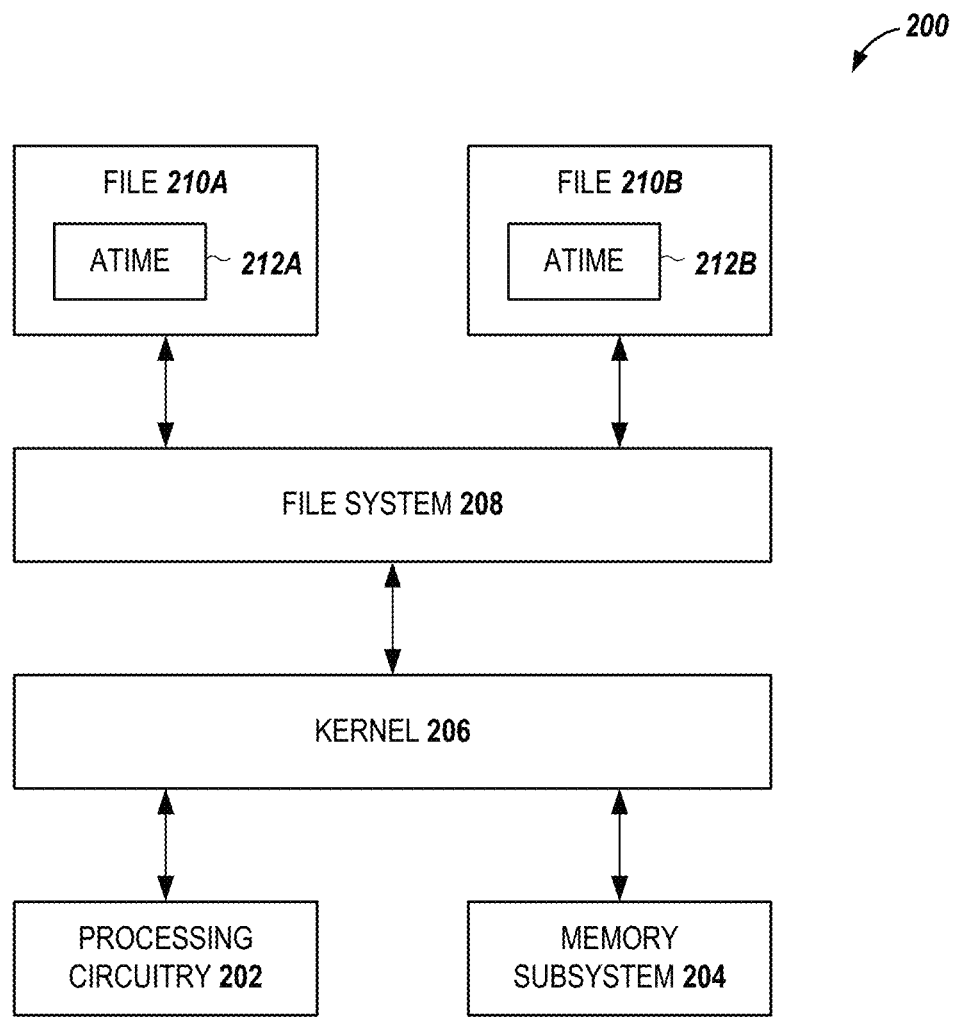
FIG. 2 illustrates an example computing environment for accessing files, in accordance with some embodiments.

FIG. 2 illustrates an example computing environment 200 for accessing files, in accordance with some embodiments. The computing environment 200 may include at least one of a physical machine (e.g., the computing machine 100) or a virtual machine. As shown, the computing environment includes processing circuitry 202 and a memory subsystem 204. The processing circuitry 202 may include a CPU, a GPU or other processing units. The processing circuitry 202 may correspond to the processor 102 or may include multiple processors. The memory subsystem 204 may include a cache unit or a storage unit. The memory subsystem 204 may include at least one of the main memory 104, the static memory 106, the drive unit 116, or the machine-readable medium 122.

The computing environment 200 includes a kernel 206. The kernel 206 is the core of the operating system. The kernel 206 manages the hardware resources of the computing environment 200, including the processing circuitry 202 and the memory subsystem 204. The kernel 206 provides basic services that other parts of the operating system need to function, such as file input/output (I/O), networking, and process management.

The computing environment 200 includes a file system 208. The file system 208 may include a single file system or multiple file systems. In some implementations, the file system 208 may correspond to a root file system and/or other file system(s) that are mounted as subtrees in a hierarchical file tree, where the root corresponds to the root file system. The file system 208 is mounted by the kernel 206 when the operating system boots up. The file system 208 includes files and directories that are essential for the operation of the operating system, such as the kernel 206, the bootloader, and the system configuration files.

As shown, the file system 208 provides access to files 210A, 210B of the computing environment 200. Each file 210A, 210B has an atime 212A, 212B, representing a time when the file 210A, 210B was accessed. The atime 212A, 212B may be included in metadata of the corresponding file 210A, 210B.

In some cases, the file system 208 allows for modification of atime 212A, 212B. In some cases, the kernel 206 updates the atime 212A, 212B upon accessing the corresponding file 210A, 210B. The computing environment 200 is illustrated as including two files 210A, 210B. However, in some implementations, the computing environment 200 may include other numbers of files.

Figure 3:
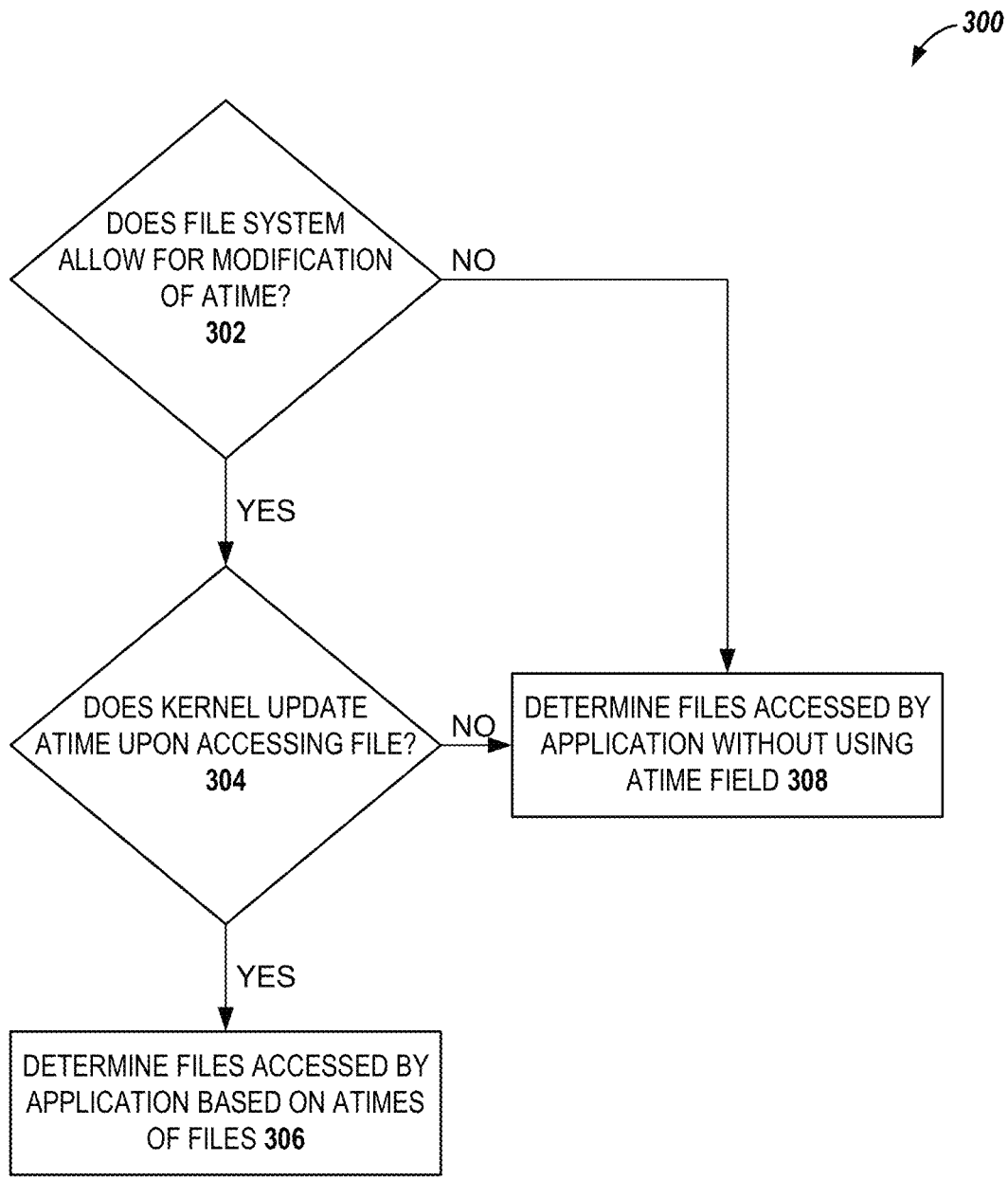
FIG. 3 is a flow chart of an example technique for selecting an instrumentation technique, in accordance with some embodiments.

FIG. 3 is a flow chart of an example technique 300 for selecting an instrumentation technique, in accordance with some embodiments. The technique 300 may be performed, for example, in the computing environment 200.

At block 302, the computing environment 200 determines whether the file system 208 allows for modification of the atime 212A, 212B. If so, the technique 300 continues to block 304. If not, the technique 300 continues to block 308.

At block 304, the computing environment 200 determines whether, in at least one case, the kernel 206 updates the atime 212A, 212B upon accessing the corresponding file 210A, 210B. If so, the technique 300 continues to block 306. If not, the technique 300 continues to block 308.

At block 306, in response to determining that the file system 208 allows for modification of the atime 212A, 212B, and that, in the at least one case (e.g., at least once during the image run), the kernel 206 updates the atime 212A, 212B upon accessing the corresponding file 210A, 210B, the computing environment 200 determines files 210A, 210B accessed by an application based on the atimes 212A, 212B of the files 210A, 210B. For example, the computing environment 200 may determine that files 210A, 210B whose atimes 212A, 212B are in a certain range (e.g., a time range while the application was running) were accessed by the application.

At block 308, in response to determining that the file system 208 does not allow for modification of the atime 212A, 212B, or that the kernel 206 never updates the atime 212A or 212B upon accessing the corresponding file 210A or 210B, the computing environment 200 determines files 210A, 210B accessed by the application without using the atime 212A, 212B. For example, the computing environment 200 determines the files 210A, 210B accessed by the application using BPF implemented at the kernel 206. In some implementations, the BPF obtains a system call by the kernel 206. The kernel 206 matches the system call to the application. The computing environment 200 records file accessed by the system call in response to matching the system call to the application.

After performing blocks 306 or 308, the computing environment provides an output representing the files accessed by the application. The output may be used for debugging purposes. The output may be used to "harden" the application by preventing the application from accessing some files that it does not typically access. This may increase the security of the application.

As described above, the computing environment 200 determines files 210A, 210B accessed by the application using a technique selected based on whether the file system 208 allows for modification of the atime 212A, 212B or whether the kernel 206 updates, in the at least one case, the atime 212A, 212B upon accessing the associated file 210A, 210B.

In some implementations, determining whether the file system 208 allows for modification of the atime 212A, 212B and whether the kernel 206 updates, in the at least one case, the atime 212A, 212B upon accessing the associated file 210A, 210B is based on accessing an application manifest file, such as Kubernetes manifest or Docker Compose file. In some implementations, determining whether the file system 208 allows for modification of the atime 212A, 212B comprises attempting to adjust an initialization time of a file 210A, 210B. In some implementations, determining whether the file system 208 allows for modification of the atime 212A, 212B includes determining whether the file system 208 is read-only. If the file system 208 is read-only, the atime method cannot be used as the atimes cannot be modified.

In some implementations, to determine whether the kernel 206 updates, in the at least one case, the atime 212A, 212B upon accessing the corresponding file 210A, 210B includes, the computing environment 200 opens a file 210A for reading and requesting a non-zero-sized file read. The computing environment 200 determines whether the atime 212A of the file 210A is updated in response to the file read request. The computing environment determines that the kernel 206 updates, in the at least one cases, the atime 212A upon accessing the corresponding file 210A. In some implementations, determining whether the kernel 206 updates the atime 212A, 212B upon accessing the corresponding file 210A, 210B is performed by doing a file read. This operation may correspond to the following C code:

```
fd = open("pathname", O_RDONLY);  // open the file for reading
read(fd, buf, 1); // a non-zero-sized file read
```

In some cases, simply opening a file might not change its atime. A non-zero-sized read request is used for atime to change. Note that the read request does not need to succeed (for example, if the file size is 0, the read will fail). It is sufficient just to try to read.

The condition that a filesystem is read-only is just a sufficient, but not a necessary condition to render atime instrumentation technique unusable. For the atime technique to work, the following two conditions are to be met: (1) the atime field in the metadata of the files of the filesystem is modifiable (e.g., to initialize the atime values of all files in the filesystem), and (2) when a file in the filesystem is accessed (e.g., using read or execute), the file's atime is updated by the kernel at least once during the image run. (This is so that the computing environment can detect which files are accessed.)

When a filesystem is mounted read-only, neither condition can be met. However, a filesystem can also be mounted as read-write, but with -noatime option enabled. In this case, atime initialization (first condition) succeeds, but the kernel does not update the atime (second condition) during the image run. In this case, the atime technique does not work even though the filesystem is not read-only.

Figure 4A:
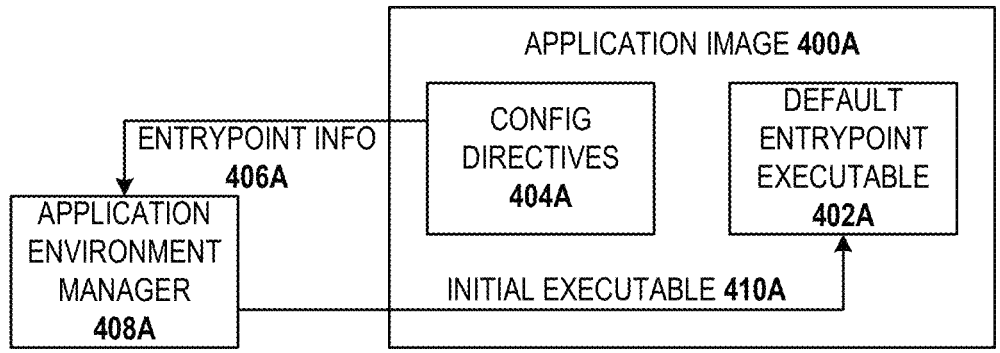
FIG. 4A illustrates a first example application structure, in accordance with some embodiments.
Figure 4B:
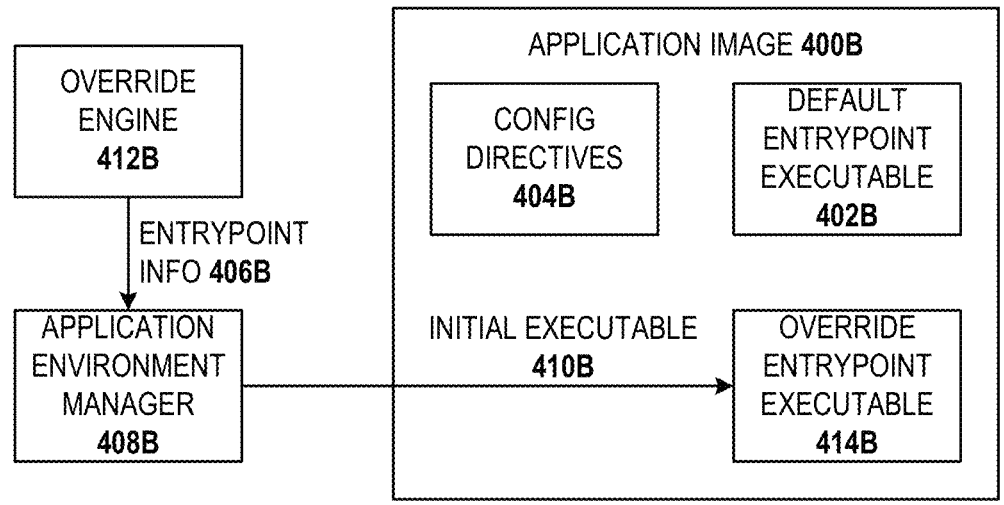
FIG. 4B illustrates a second example application structure, in accordance with some embodiments.

FIGS. 4A-4B illustrate example application structures, in accordance with some embodiments.

FIG. 4A illustrates an application image 400A. As shown, the application image 400A has a default entrypoint executable 402A and config (configuration) directives 404A. The application image 400A is started. Specifically, a container manager (e.g., Docker) sets up an isolated computing environment, including a temporary instantiated storage which contains the application image as its contents. As shown, the config directives 404A provide entrypoint info (information) 406A to the application environment manager 408A. An entrypoint is a configuration directive of an application image 400A that specifies the path of the initial executable 410A—the default executable (optionally with arguments) to be executed upon starting the application image 400A. When the application image 400A, which contains the configuration directive entrypoint pointing to the default entrypoint executable 402A, is started, the default entrypoint executable 402A (with arguments if specified in the entrypoint directive) is executed. As shown, the application environment manager 408A causes execution of the initial executable 410A, which corresponds to the default entrypoint executable 402A The application corresponding to the application image 400A may be a container or a virtual machine.

FIG. 4B illustrates an application image 400B. Similar to the application corresponding to application image 400A, the application corresponding to application image 400B may be a container or a virtual machine. Similar to the application image 400A, the application image 400B includes a default entrypoint executable 402B and config directives 404B. However, upon starting the application image 400B, an override engine 412B (e.g., a mutating webhook) overrides the entrypoint configuration directive (from the config directives 404B) of the application image 400B, causing execution of the override entrypoint executable 414B instead. Specifically, as shown, the entrypoint info 406A from FIG. 4A provided by the config directives 404A is replaced with entrypoint info 406B provided by the override engine 412B. The application environment manager 408B, upon receiving the entrypoint info 406B, causes execution of the initial executable 410B, which now points to the override entrypoint executable 414B. The execution of the override entrypoint executable 414B starts an initialization process, which identifies the application corresponding to the application image 400B and arranges the monitoring of processes that access the application or processes that are accessed by the application. The initialization process arranges the monitoring of data and processes entering or exiting the application during the execution of the application. After the initialization work is done, the initialization process executes the default entrypoint executable 402B.

In some implementations, the override engine 412B is a mutating webhook. The mutating webhook is a type of webhook that can be used to modify Kubernetes objects before they are created or updated. For example, the mutating webhook can be used to add or remove labels, annotations or other metadata from objects, or to inject sidecar containers into pods. Mutating webhooks allow for extension of functionality of Kubernetes. The webhook in Kubernetes is a user-defined procedure for inspecting and changing the Kubernetes configuration before the Kubernetes acts on it. Some implementations disclosed herein change the container entrypoint (the first executable to run). Alternatively, the disclosed technique could be implemented using technologies different from Kubernetes and the override engine 412B may use other event notification techniques.

FIGS. 4A-4B illustrate the static view of the application images 400A, 400B. The application image 400A, 400B includes, among other things, the initial contents of the file system (e.g., the root file system) upon instantiation, as well as a set of directives (e.g., config directives 404A, 404B) used to inform the application environment manager 408A, 408B how the application image 400A, 400B is to be instantiated. One of these directives specifies the entrypoint (e.g., the default entrypoint executable 402A or the default entrypoint executable 402B), which is the path to an executable, along with the command-line arguments, that is to be run when the application starts.

Figure 5A:
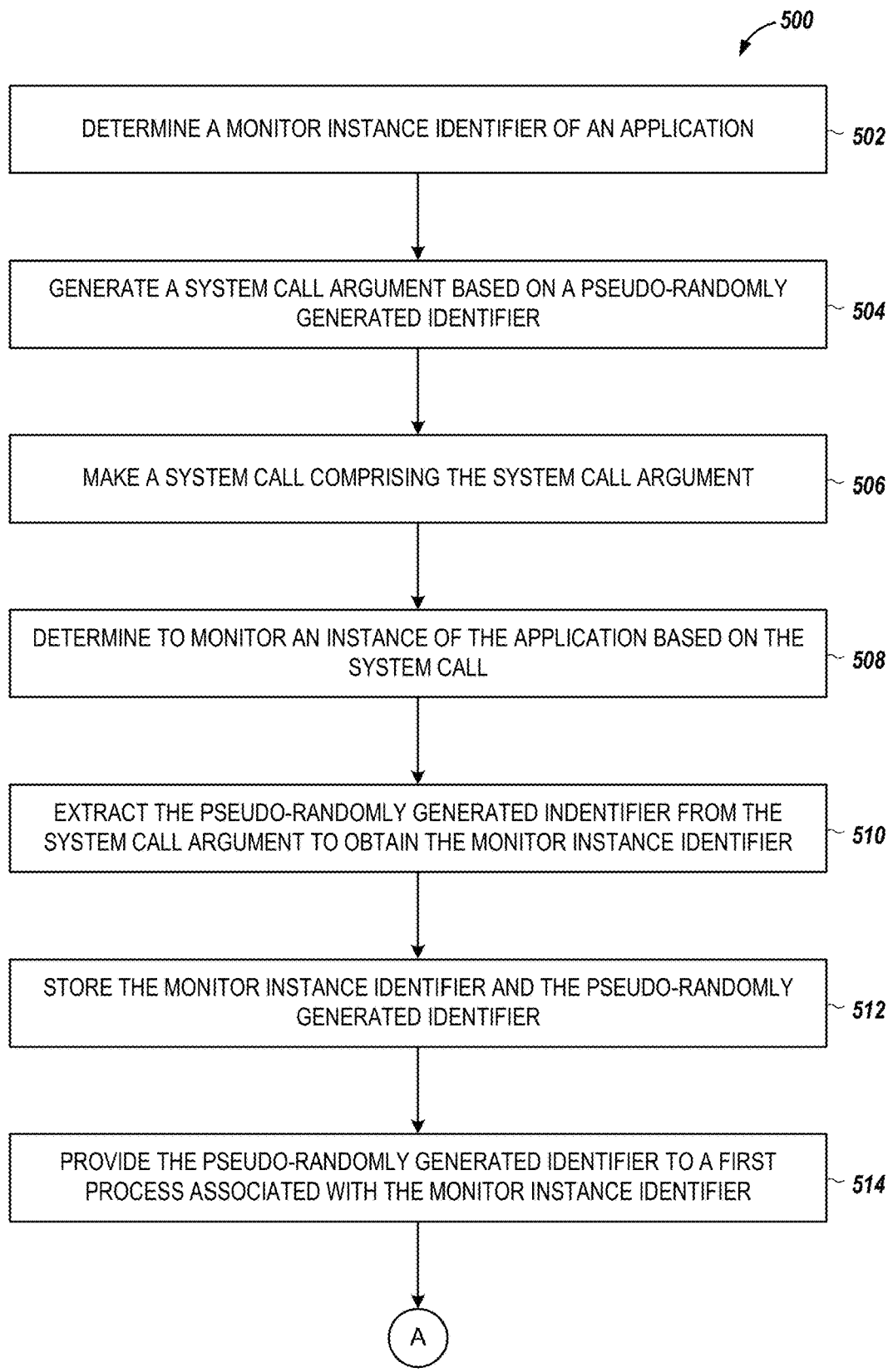
FIGS. 5A-5B are a flow chart of an example technique for obtaining instrumentation data of an application.
Figure 5B:
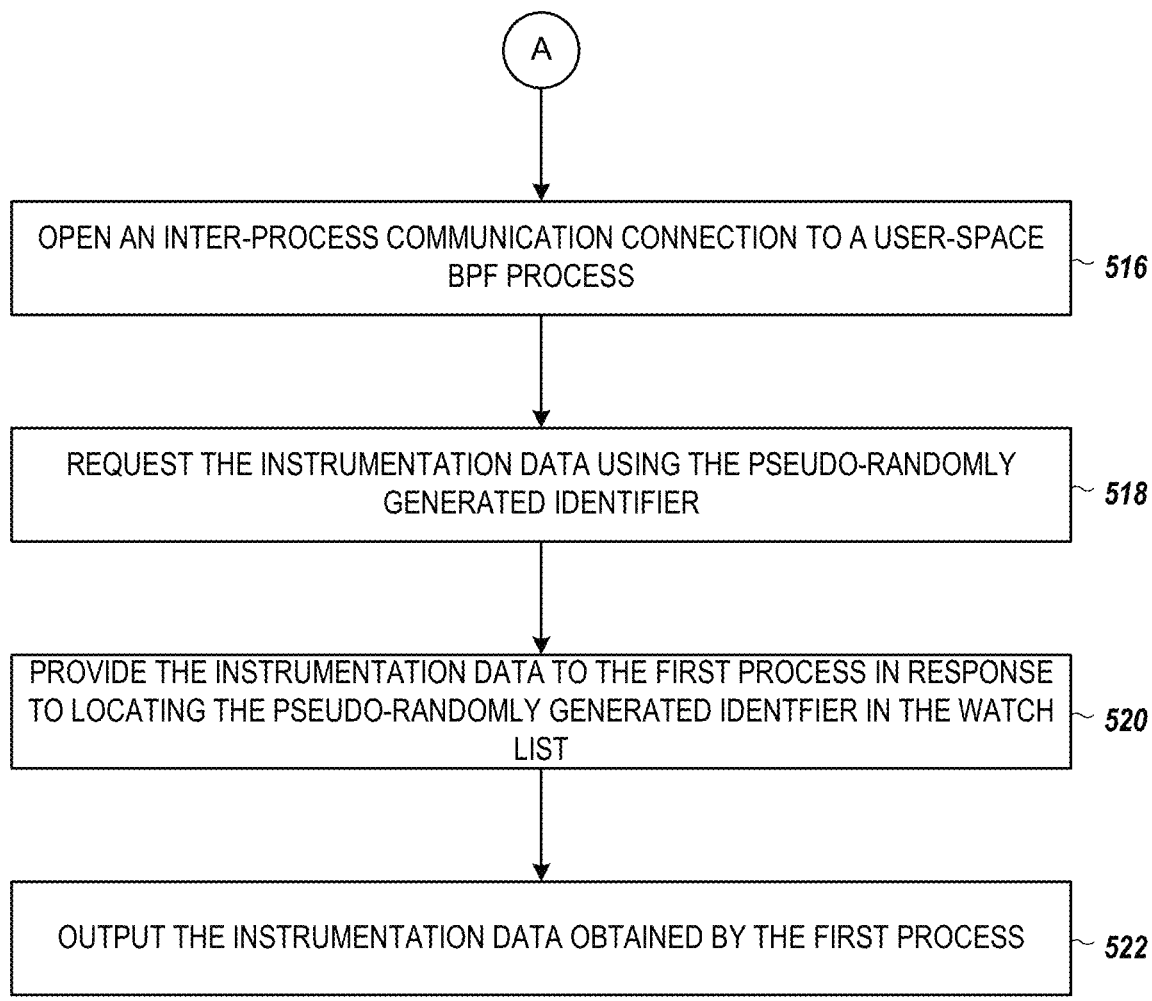

FIGS. 5A-5B are a flow chart of an example technique 500 for obtaining instrumentation data of an application.

As shown in FIG. 5A, at block 502 an initialization process determines a monitor instance identifier of an application. The initialization process initializes monitoring of the application. The application may be, for example, a container or a virtual machine. In some cases, the application is managed by an application management architecture. The application management architecture may be Kubernetes, Docker, Docker Compose, or Docker Swarm. If the application management architecture is Kubernetes, the initialization process may be attached to the application via a mutating webhook. For other application management architectures, a general way to override the entrypoint executable is to use a program or a service to convert the original application manifest file before the file is fed to the application environment manager to start an application.

At block 504, the initialization process generates a system call argument (e.g., a pathname or another argument value) based on a pseudo-randomly generated identifier. The pseudo-randomly generated identifier may include a universally unique identifier (UUID). Any computer-implemented (e.g., machine-implemented) technique to generate a pseudo-random or random identifier may be used. For example, the pseudo-randomly generated identifier may be generated using a linear congruential generator (LCG) algorithm, a Mersenne twister algorithm or a Blum Blum Shub algorithm. These algorithms are based on mathematical functions that produce sequences of numbers that have certain statistical properties that are similar to those of truly random numbers. For example, the sequences of numbers generated by these algorithms should be evenly distributed, meaning that there should be no more or fewer of any particular number than any other. In some cases, the pseudo-random identifier generator may be provided with a seed value as input. The seed value may be a predetermined number which may correspond to a time of day (e.g., a number of second since midnight), a user's mouse movement, a system's entropy pool or another value. The system's entropy pool is a collection of random data that is gathered from various sources, such as keyboard input, mouse movements, and network traffic. In some cases, generating the system call argument comprises generating the system call argument with a fixed marker string. In some cases, generating the system call argument comprises generating the system call argument without a fixed marker string.

At block 506, the initialization process makes a system call comprising the system call argument. In some cases, the system call argument comprises a pathname, and the system call comprises a read-mode open system call to open a path associated with the pathname. As used herein, the term "pathname" may reference, among other things, a statement of the location of a file or other item in a directory or a hierarchy of directories. A pathname may include a filename and/or the names of one or more folders, directories or subdirectories.

At block 508, a kernel-space BPF determines to monitor an instance of the application based on the system call.

At block 510, the kernel-space BPF extracts the pseudo-randomly generated identifier from the system call argument to obtain the monitor instance identifier.

At block 512, the kernel-space BPF stores, in a watch list (e.g., any data structure storing monitor instance identifiers of applications being monitored and their associated pseudo-randomly generated identifiers; the data structure could be, for example and without limitation, at least one of a look-up array, a linked-list containing identifier mapping elements, a dictionary, a database table, or the like), the monitor instance identifier and the pseudo-randomly generated identifier. After block 512, the computing environment obtains instrumentation data using the monitor instance identifier and the pseudo-randomly generated identifier, for example, as described below. The instrumentation data may include, for example and among other things, file access data, network traffic data, or operating system call data (e.g., system call data). The obtained instrumentation data are made available to the user-space BPF process.

At block 514, the initialization process provides the pseudo-randomly generated identifier to a first process (e.g., a log process) associated with the monitor instance identifier. In some examples, the first process resides in the application in which the initialization process resides.

As shown in FIG. 5B, at block 516, the first process opens an inter-process communication connection to a user-space BPF process.

At block 518, the first process requests the instrumentation data using the pseudo-randomly generated identifier.

At block 520, the user-space BPF process provides the instrumentation data to the first process in response to locating the pseudo-randomly generated identifier in the watch list. In some cases, the user-space BPF determines whether the user-space BPF process is receiving a first request (or another request, e.g., a given request) associated with the pseudo-randomly generated identifier. The user-space BPF provides the instrumentation data in response to determining that the user-space BPF process is receiving the first request associated with the pseudo-randomly generated identifier. The user-space BPF forgoes providing the instrumentation data in response to determining that the user-space BPF process is receiving a subsequent request associated with the pseudo-randomly generated identifier. The subsequent request is received after the first request. In some cases, the user-space BPF process determines whether the user-space BPF process has received one or more prior requests associated with the pseudo-randomly generated identifier and whether the instrumentation data have previously been provided responsive to at least one of the one or more prior requests. The user-space BPF process provides the instrumentation data in response to determining that the one or more prior requests do not exist or that the instrumentation data have not previously been provided responsive to each and every one of the one or more prior requests. The user-space BPF process forgoes providing the instrumentation data in response to determining that the instrumentation data have previously been provided responsive to the at least one of the one or more prior requests.

At block 522, the computing environment outputs the instrumentation data obtained by the first process. The instrumentation data may be used, for example, to debug the application or to increase security by limiting the ability of the application to access computing data (e.g., files, network ports, or operating system calls (e.g., system calls)) that the application does not access in its typical operation. For example, the application could be blocked from accessing all or part of the data that the application does not access in its typical operation. In debugging, all or a portion of the instrumentation data may be included in the visual output of a debugger program. In some cases, the instrumentation data in the output may trigger debugging via a debugger program or security alerting via a security alerting program. For example, the instrumentation data may indicate activity that is abnormal for an application associated with the application type (e.g., a word processing application transmitting or receiving large amounts of data over a network, where the word processing application typically does not transmit or receive large amounts of data). In some cases, the instrumentation data may automatically trigger debugging or security alerting, for example, if the application accesses a secure part of the operating system for the first time in a threshold time period (e.g., one month) or if the application engages in certain activity (e.g., downloading an amount of data measured in bytes) an order of magnitude (e.g., 10 times) more than in previous usage of the application.

Figure 6:
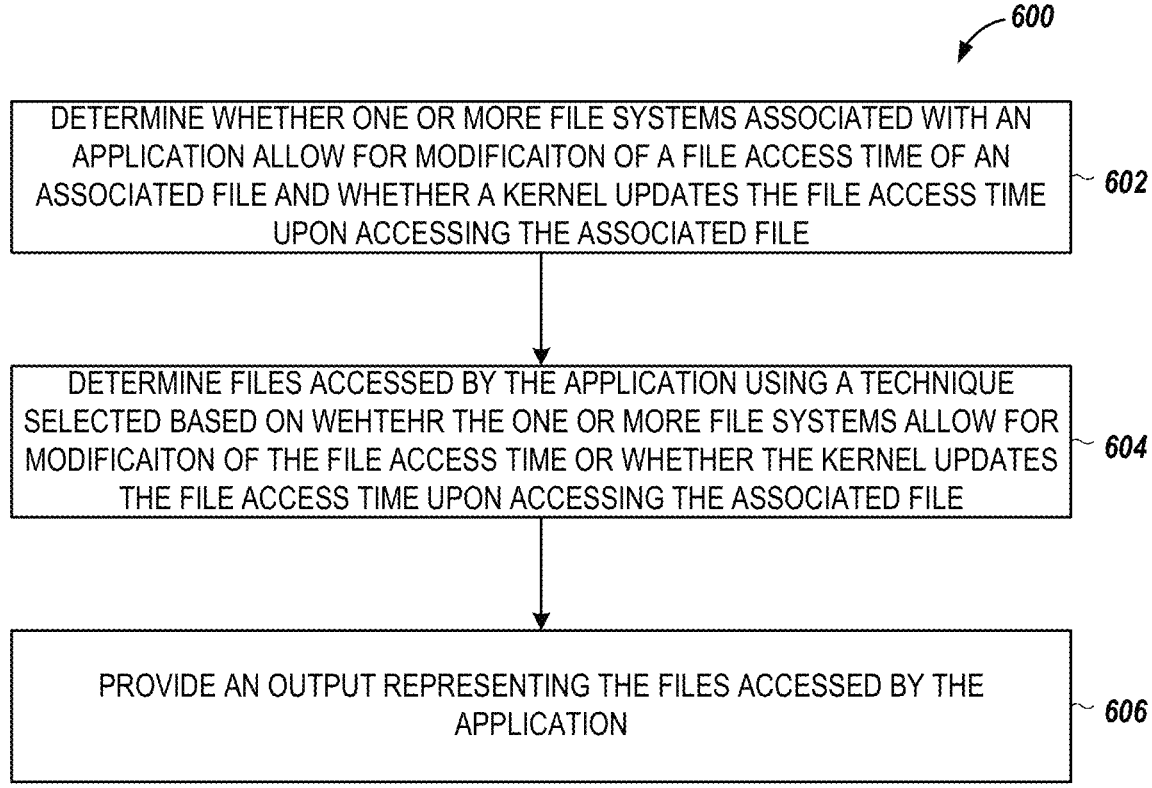
FIG. 6 is a flow chart of an example technique for selecting an instrumentation technique.

FIG. 6 is a flow chart of an example technique 600 for selecting an instrumentation technique.

At 602, a computing environment determines whether one or more file systems associated with an application allow for modification of a file access time of an associated file and whether a kernel updates, in at least one case, the file access time upon accessing the associated file. The associated file is at least one file managed by the one or more file systems. In some cases, determining whether the one or more file systems allows for modification of the file access time and whether the kernel updates, in the at least one case, the file access time upon accessing the associated file is based on an application manifest, such as Kubernetes manifest or Docker Compose file.

In some cases, the computing environment determines whether the kernel updates, in the at least one case, the file access time upon accessing the associated file by attempting to adjust an initialization time of the associated file. For example, the computing environment opens the associated file for reading and requests a non-zero-sized file read. The computing environment determines whether the file access time of the associated file is updated in response to the file read request. The computing environment determines that the kernel updates, in the at least one case, the file access time upon accessing the associated file in response to the file access time of the associated file being updated in response to the file read request.

In some cases, the computing environment determines whether the one or more file systems allow for modification of the file access time by determining whether the one or more file systems are read-only. A read-only file system does not allow for modification of the file access time, as such a file system does not allow for modification (e.g., writing) of any data.

At 604, the computing environment determines files accessed by the application using a technique selected based on whether the one or more file systems allow for modification of a file access time or whether a kernel updates, in the at least one case, the file access time upon accessing the associated file. For example, in response to determining that the one or more file systems allow for modification of the file access time and that the kernel updates, in the at least one case, the file access time upon accessing the associated file, the computing environment determines the files accessed by the application based on a set of file access times, which may include the file access time. Alternatively, in response to determining that the one or more file systems do not allow for modification of the file access time or that among all files that have been accessed, there exists at least one file the access time of which is not updated by the kernel in any access to that file (e.g., the kernel never updates the file access time upon accessing the associated file), the computing environment determines the files accessed by the application without using a file access time field.

Determining the files accessed by the application without using the access time field may include determining the files accessed by the application using BPF implemented at an operating system kernel. For example, to determine the files accessed by the application using BPF, the operating system kernel obtains, using the BPF, a system call. The operating system kernel matches the system call to the application. The computing environment records files accessed by the system call in response to matching the system call to the application.

At 606, the computing environment provides an output representing the files accessed by the application.

Some implementations relate to the workings of the BPF instrumentation technique.

The BPF instrumentation technique utilizes Berkeley Packet Filter technology provided by the Linux kernel to monitor system calls (syscalls). BPF, as the name suggests, was originally (the "classic" BPF or cBPF) designed as a filter framework for network protocol stacks. Later it was expanded as a general-purpose kernel tracing facility and called extended BPF (eBPF). As used herein, BPF may refer to both cBPF and eBPF.

BPF instrumentation may be implemented as a BPF component which includes two parts: a kernel-space BPF filter program and a user-space BPF program.

The kernel-space BPF filter program gets invoked at various execution points (e.g. each syscall entry) in the kernel code. For the instrumentation purpose, some aspects configure syscall entry as the trigger points.

The user-space BPF program runs as a process in its own container. The user-space BPF program serves two functions. First, the user-space BPF program administers the kernel-space BPF filter. It is responsible for loading the kernel-space BPF filter into the kernel, configuring the kernel triggers so that the kernel-space BPF filter to get invoked upon every syscall made by any process, and collecting the messages outputted by the kernel-space BPF filter. The user-space BPF program forwards the information from the kernel-space BPF filter to the log process which connects to it via an inter-process communication technology (e.g., TCP).

One purpose of the instrumentation is to monitor the file access made by the processes of a particular application instance (e.g., container). In some instrumentation methods, the way those methods work ensure they only monitor a single application instance, so there was no need to use an application instance ID. In contrast, the BPF filter disclosed herein may intercept all syscalls across all application instances (e.g., containers) in the same machine (e.g., virtual machine or physical machine), so differentiation of syscalls belonging to different application instances may be useful. Some implementations leverage the application instance ID for this differentiation.

Some implementations monitor the file access made by a group of processes meeting some criteria in a machine (virtual or physical). Some implementations leverage an identifier that can distinguish between different groups of processes. This identifier has the following properties: (i) the identifier is unique for every group in the same machine, (ii) the identifier is based on some easily obtainable information provided by the kernel to the kernel-space BPF filter regarding the syscall calling process, and (iii) the identifier of a group is easily obtainable in the user-space by processes in that group.

In some implementations, the criteria used to group processes into different "monitor groups" is the application instance (e.g., container) to which a process belongs. The identifier of a group may be referred to as a monitor instance ID or an application instance ID.

In Linux, a namespace is an abstraction that makes a global system resource appear to the processes within the namespace that they have their own isolated instance of the global resource. Linux provides 8 types of namespaces: Cgroup, IPC, Network, Mount, process identifier (PID), Time, User and Unix time-sharing system (UTS). Each namespace type isolates one type of global system resources. For example, a UTS namespace isolates the hostname and the network information service (NIS) domain name. The processes in the same UTS namespace share the same hostname and NIS domain name. Each UTS namespace has its own copy of the hostname/NIS domain name and is not affected by changes made in other UTS namespaces. Every process belongs to one namespace in each of these namespace types. When an application instance (e.g., container) is started, it may be started with its own namespaces of all types. (This behavior may be configurable in the computing environment manager.) This is so that any changes made by processes inside an application instance (e.g., container) may be isolated from outside that instance.

In the kernel, each namespace, regardless of the type of the namespace, is assigned a unique integer, called inode number, which serves as the namespace identifier. Since each new application instance (e.g., container) gets its own private namespace of each namespace type, the PID namespace of the application instance (e.g., container), for example, will be different from that of another application instance (e.g., container). However, all processes in the same application instance (e.g., container) share the same PID namespace, so the inode number of these processes' PID namespace might always be the same. Another good thing about a namespace inode number (e.g., "namespace ID") is that they are easily obtainable either from user-space or in kernel-space. Therefore, namespace IDs may meet the above features (i)-(iii) of application instance ID. Since a process has eight namespace IDs, one for each namespace type, some implementations could choose anyone of these as the application instance ID, as long as the computing environment manager is configured to start each new application instance (e.g., container) with a new namespace of that type. Some embodiments use the "UTS namespace ID" as the application instance ID.

As discussed above, in BPF instrumentation, the BPF filter is invoked for syscalls from the processes. In order to filter out syscalls that are not relevant, the kernel-space BPF filter is informed about the application instance ID of the application instance (e.g., container) whose processes are to be monitored. The kernel-space BPF program keeps a list of application instance IDs to be monitored (the "application instance ID watch list"). With this application instance ID watch list, the kernel-space BPF program performs the following operations upon each syscall entry: (a) obtain the calling process's information from the kernel and obtain the application instance ID of the application instance (e.g., container) to which this process belongs; (b) perform the following checks, if any of the checks fail, simply return and do nothing (i) the calling process's application instance ID is in the application instance ID watch list, and (ii) the syscall is a path-related syscall (e.g., a syscall with a pathname in its arguments); and (c) record the file access and send a message to the user-space BPF program reporting the file access.

Some implementations include techniques to request the BPF component to begin monitoring an application instance (e.g., container) for file accesses. To do this, some aspects leverage techniques to communicate the application instance ID of the application instance to be monitored to the kernel-space BPF filter. Some implementations include a log component which retrieves the file access data of the specified application instance (e.g., container) from the user-space BPF process, which receives the data from the kernel-space BPF filter, buffers them until the log process reads them.

One place to request the kernel-space BPF filter to begin monitoring a new application instance (e.g., container) is in the new application instance's initialization process. The initialization process may be started by executing the override entrypoint executable 414B. The following shows one way to do this.

In the first operation, the initialization process finds out the application instance ID of the current application instance. If UTS namespace ID is chosen as the application instance ID, then the initialization process may read the value of the symbolic link /proc/self/ns/uts The value will be in the form of "uts: [4026531838]" where the number 4026531838 is the ID.

In the second operation, the initialization process sends this ID to the user-space BPF process through some inter-process communication technology. Some implementations use a TCP socket. The user-space BPF process, after finishing setting up the kernel-space BPF filter, waits on a TCP socket for new requests. When a new connection arrives, the user-space BPF process reads from the socket the application instance ID sent by the initialization process in the new application instance (e.g., container). The user-space BPF process then informs the kernel-space BPF filter about the new application instance to monitor. In response, the kernel-space BPF filter monitors the syscalls made by the processes in this new application instance and reports the file access data to the user-space BPF process.

When the log process is to read the file access data, the log process connects to the user-space BPF process via a TCP socket and presents the target application instance's application instance ID. The user-space BPF process checks if the application instance ID is on the application instance ID watch list. If yes, it sends the application instance's file access data to the log process via the established TCP connection.

Weaknesses of the above implementation include the following. First, it assumes/proc filesystem is available. In the first operation, the initialization process is to access/proc filesystem to find out its application instance ID. /proc filesystem is available in some cases. In other cases, it might be disabled. For example, it might be disabled in some high-security systems. Second, since namespace IDs might not be random, there is a risk that a hacker (e.g., a malicious actor) might get access to file access data of an application instance if the hacker can guess the application instance ID and connect to the user-space BPF program before the legitimate log process does.

To deal with these weaknesses, some implementations of the disclosed technology present a technique for communicating an application instance ID to the kernel-space BPF filter as well as allowing the log process to connect to the user-space BPF process more securely.

The first weakness above is caused by the fact that a user-space program accesses to/proc filesystem to read its namespace ID. There is no such problem in kernel-space BPF filter, which has access to a syscall-calling process's namespace ID regardless of the availability of/proc file system. So, instead of passing the namespace ID from user space, some implementations inform the kernel-space BPF filter that the application instance to which the current syscall-calling process belongs is to be monitored. The kernel-space BPF then obtains information regarding the syscall-calling process to figure out the namespace ID.

The second weakness results from the use of the same identifier in communicating the application instance ID to request the kernel-space BPF filter to begin monitoring an application instance (e.g., container) and to connect to the user-space BPF process to retrieve the file access data. This weakness may be solved by using a pseudo-randomly generated identifier as the ticket which the log process presents to the user-space BPF process to request the file access log. This pseudo-random identifier pairs with the application instance ID internally. When the initialization process requests the kernel-space BPF filter to begin monitoring its application instance, it notifies the kernel-space BPF filter of this pseudo-randomly generated ticket which the log process will need to present to request for file access data. Now that the log request ticket is a pseudo-randomly generated identifier, it might be more difficult or impossible for the hacker to determine or guess the correct identifier.

Some implementations perform the following operations.

In a first operation, the initialization process constructs a special pathname with a fixed marker string plus a randomly generated identifier. For example, some implementations use a pathname in this format: /.NAME_eBPF [UUID] where [UUID] is a 128-bit randomly generated UUID (Universally Unique IDentifier) expressed in UUID string. A UUID example is 123e4567-e89b-12d3-a456-426614174000.

In a second operation, the initialization process then makes a read-mode open( ) syscall to open the pathname created in the first operation.

In a third operation, the kernel-space BPF filter is called at the entry of every syscall made from all processes on the machine. When it detects an open( ) syscall with a pathname argument which matches the special format mentioned in the first operation above, it treats this syscall as a request from the calling process to monitor the application instance (e.g., container). It extracts the UUID from the pathname argument, and obtains the application instance ID from kernel data structures about the calling process. It then enters the (application instance ID, UUID) pair in the application instance ID watch list.

In a fourth operation, the initialization process spawns a new log process within the same application instance (e.g., container) and passes the UUID string to the log process. The initialization process may also pass the UUID string to an existing log process running outside the current application instance.

In a fifth operation, the log process, regardless of whether it is in the same application instance (e.g., container) as the initialization process, opens a TCP connection to the user-space BPF process and presents the UUID string to request file access data. The user-space BPF process looks up the UUID in the application instance ID watch list. If the UUID exists, it transfers the file access data of the application instance associated with this UUID.

In a sixth operation, as a security improvement for preventing log hijacking, when the user-space BPF process finds that the UUID presented by the log process exist in the application instance ID watch lists, the user-space BPF process further checks whether this is the first request of this UUID. For each valid UUID, only the first connection is allowed. Subsequent connection are closed without transferring any file access data.

Some aspects relate to the application ID (e.g., container ID) detection technique.

In the application ID detection technique, the initialization process uses a special pathname to request the kernel-space BPF filter to begin monitoring the application instance to which it belongs. One example pathname format (a fixed marker string concatenated with UUID) is described above. However, other pathname formats may be used in conjunction with the disclosed technology.

In some cases, the pathname format may have one or more of the following features: (a) it is a valid Linux pathname, (b) the name is unique for each application instance with which it is associated, (c) the number of possible names is large enough such that testing all possible names is practically infeasible, and (d) the generated names are random enough in the sense that there is no correlation or minimal correlation between successively generated names such that, given one name, the number of possible next names is still large enough that testing all of them is practically infeasible.

One or more of the following procedures may be used to support the application ID detection technique.

GenerateUniqueID( )—This function takes no argument. It generates a random ID that meets the features (b), (c), and (d) above. This operation may generate a 128-bit pseudo-random number, which is the UUID.

MakeSpecialPathname(uniqueid)—This function takes a random ID and transforms it into a valid Linux file path that can be passed to open( ) syscall. In some implementations, this operation constructs the special pathname by concatenating a fixed marker string with the UUID string in the format "/.NAME_eBPF [UUID]" where [UUID] is the UUID expressed in UUID string format. An example UUID string is 123e4567-e89b-12d3-a456-426614174000.

ValidateSpecialPathname(pathname)—This function takes a pathname as the input argument. It checks whether the pathname is a valid name generated by MakeSpecialPathname( ). It returns true if it is, false otherwise. In some implementations, this function checks whether the pathname begins with the fixed string "/.NAME_eBPF", then followed by a valid UUID string (hhhhhhhh-hhhh-hhhh-hhhh-hhhhhhhhhhhh, where h denotes a hex character 0-9,a-f,A-F).

ExtractUniqueIDFromSpecialPathname(pathname)—
This function takes a valid special pathname as the input argument. It then transforms, decodes, extracts the embedded unique ID from the pathname. In some implementations, this function extracts the UUID string from the file path, then converts it back to a 128-bit number. Note that, depending on the way the conversion is done, ValidateSpecialPathname( ) and ExtractUniqueIDFromSpecialPathname( ) could be implemented as a single function.

In some implementations, the pathname includes a fixed marker string concatenated with a UUID string. However, when the pathname generation and validation procedures are abstracted, more complicated types of special pathnames may be supported. As an example, the following shows how to construct a special pathname with a UUID string concatenated with a hash value. The pathnames generated using this method might not have an apparent fixed marker string, yet some aspects can still verify whether a given string is a valid special pathname string. Alternatively, the pathname is generated without the fixed marker string, and the pathname lacks the fixed marker string.

GenerateUniqueID( ) generates a 128-bit pseudo-random number.

In MakeSpecialPathname(uniqueid), the pathname includes two parts. The first part is just the UniqueID in UUID string format (hhhhhhhh-hhhh-hhhh-hhhh-hhhhhhhhhhhh, where h denotes a hex character 0-9,a-f,A-F). The second part is the hex string of the hash value of the string [UUID] [secret word] (UUID string of the UniqueID followed by a fixed secret word string) Any hash function can be used. An example hash function is MD5 message digest function. The following shows an example of special pathname generation.

```
If UUID=673d2d4e-00ee-e4ae-7191-f0d7a7d72992
secret word="foobar"
then hash value=MD5("673d2d4e-00ee-e4ae-7191-f0d7a7d72992foorbar")
=0x87bfb5eec08e55bb83d3b74f640b55e0
Special pathname=[UUID][hash]=
"673d2d4e-00ee-e4ae-7191-f0d7a7d7299287bfb5eec08e55bb83d3b74f640b55e0"
```

ValidateSpecialPathname(pathname) validates a pathname. To validate the pathname, this function first splits the pathname into UUID part and the hash part. Since the lengths of both strings are fixed, this can be easily done based on the fixed lengths. Next, this function takes the UUID string and calculates the hash value of the string [UUID][secret word], just as how it was done in the MakeSpecialPathname( ) procedure. Finally, the function checks whether the hash value string part of the pathname matches the calculated hash value. If they match, the special pathname is valid.

```
Special pathname=[UUID][hash]=
    "673d2d4e-00ee-e4ae-7191-f0d7a7d7299287bfb5eec08e55bb83d3b74f640b55e0"
UUID string=673d2d4e-00ee-e4ae-7191-f0d7a7d72992
Hash value string=87bfb5eec08e55bb83d3b74f640b55e0
Secret word="foobar"
Hash value=MD5("673d2d4e-00ee-e4ae-7191-f0d7a7d72992foorbar")
=0x87bfb5eec08e55bb83d3b74f640b55e0
Calculated hash value matches the hash value string → The special pathname is valid.
```

ExtractUniqueIDFromSpecialPathname(pathname) extracts the unique ID, which is the first 36 characters of the pathname (the UUID string part of the pathname).

These procedures may be used during the application ID detection.

During initialization, the initialization process executes GenerateUniqueID( ) to generate a unique ID. This ID is used by the kernel-space BPF filter to match the log requesting process with the application instance ID. The initialization process then executes MakeSpecialPathname( ) to convert the unique ID into a valid Linux pathname. The initialization process does a read-mode open( ) on this pathname. The initialization then passes the unique ID to the log process.

In the kernel-space BPF filter, when an incoming syscall is a path-related syscall, the BPF filter executes ValidateSpecialPathname( ) on the pathname argument to determine whether this is a valid special pathname. If it is a valid special pathname, the BPF filter executes ExtractUniqueID-FromSpecialPathname( ) on the pathname argument to extract the unique ID. The kernel-space BPF filter stores the unique ID along with the syscall-calling process's application instance ID in a watch list and begins monitoring the syscall-calling process's application.

The log process receives the unique ID information from the application instance's initialization process. When the log process connects to the user-space BPF process to request the file access log, it presents this unique ID.

As set forth above, the pathname generation is based on a pseudo-randomly generated identifier. The identifier string could be part of the pathname, or it could be encoded, transformed, embedded in the pathname. Some implementations are described above referring to a pathname. In alternative implementations, a system call argument (which may or may not be a pathname) may be used in place of the pathname or in addition to the pathname, as described above. The system call argument may be path-related. Alternatively, the system call argument might not be path-related.

In the application ID passing and detection technique, the generation of the special pathname happens in an initialization process which executes prior to the original entrypoint of a container.

Some possible ways to start the initialization process include the following. The initialization process may be started by stubbing the container image so that, when the stubbed image is run, the stub of entrypoint program gets run. The stub is the initialization process which chooses a suitable instrumentation method. The initialization process may be started in Docker by using Dockerfile to mount instrumentation tools and override the entrypoint program. The initialization process may be started manually by specifying the mount and entrypoint program in Dockerfile. The initialization process may be started by using Docker Compose YAML (yet another markup language) file for mounting instrumentation tools and overriding the default entrypoint. The initialization process may be started by using Kubernetes admission controller to automatically override the entrypoint program.

The disclosed techniques may be used in container cluster management infrastructure such as Kubernetes, Docker Compose or Docker Swarm. Also, they can also be used in non-cluster management environments such as plain Docker.

Some embodiments are described as numbered examples (Example 1, 2, 3, etc.). These are provided as examples only and do not limit the technology disclosed herein.

Example 1 is a computer-implemented (e.g., machine-implemented) method comprising: determining, by an initialization process, a monitor instance identifier of an application (e.g., an instance of an application), wherein the initialization process initializes monitoring of the application (e.g., the instance of the application); generating, by the initialization process, a system call argument based on a pseudo-randomly generated identifier; making, by the initialization process, a system call comprising the system call argument; determining, by a kernel-space Berkeley packet filter (BPF), to monitor an instance (e.g., the instance) of the application based on the system call; extracting, by the kernel-space BPF, the pseudo-randomly generated identifier from the system call argument to obtain the monitor instance identifier; storing, in a watch list, the monitor instance identifier and the pseudo-randomly generated identifier; and obtaining instrumentation data using the monitor instance identifier and the pseudo-randomly generated identifier.

In Example 2, the subject matter of Example 1 includes, wherein obtaining the instrumentation data using the monitor instance identifier and the pseudo-randomly generated identifier comprises: providing, by the initialization process, the pseudo-randomly generated identifier to a first process associated with the monitor instance identifier; opening, by the first process, an inter-process communication connection to a user-space BPF process; requesting, by the first process, the instrumentation data using the pseudo-randomly generated identifier; and providing, by the user-space BPF process, the instrumentation data to the first process in response to locating the pseudo-randomly generated identifier in the watch list.

In Example 3, the subject matter of Example 2 includes, outputting the instrumentation data obtained by the first process.

In Example 4, the subject matter of Examples 2-3 includes, wherein the first process resides in the application (e.g. the instance of the application) in which the initialization process resides.

In Example 5, the subject matter of Examples 2-4 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process is receiving a given request associated with the pseudo-randomly generated identifier; and providing the instrumentation data to the first process in response to determining that the user-space BPF process is receiving the given request associated with the pseudo-randomly generated identifier.

In Example 6, the subject matter of Example 5 includes, forgoing providing the instrumentation data to the first process in response to determining that the user-space BPF process is receiving a subsequent request associated with the pseudo-randomly generated identifier, wherein the subsequent request is received after the given request.

In Example 7, the subject matter of Examples 2-6 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process has received one or more prior requests associated with the pseudo-randomly generated identifier and whether the instrumentation data have previously been provided responsive to at least one of the one or more prior requests; and performing at least one of (i) providing the instrumentation data to the first process in response to determining that the one or more prior requests do not exist or that the instrumentation data have not previously been provided responsive to each and every one of the one or more prior requests, or (ii) forgoing providing the instrumentation data to the first process in response to determining that the instrumentation data have previously been provided responsive to the at least one of the one or more prior requests.

In Example 8, the subject matter of Examples 1-7 includes, wherein the pseudo-randomly generated identifier comprises a universally unique identifier (UUID).

In Example 9, the subject matter of Examples 1-8 includes, wherein the application (e.g. the instance of the application) comprises a container.

In Example 10, the subject matter of Examples 1-9 includes, wherein the application is managed by an application management architecture, wherein the application management architecture comprises Docker, Docker Compose, Docker Swarm or Kubernetes.

In Example 11, the subject matter of Examples 1-10 includes, wherein the application is managed by an application management architecture, wherein the application management architecture comprises Kubernetes, wherein the initialization process is attached to the application via a mutating webhook.

In Example 12, the subject matter of Examples 1-11 includes, wherein the system call argument comprises a pathname, wherein the system call comprises a read-mode open system call to open a path associated with the pathname.

In Example 13, the subject matter of Examples 1-12 includes, wherein generating the system call argument comprises generating the system call argument with a fixed marker string.

In Example 14, the subject matter of Examples 1-13 includes, wherein generating the system call argument comprises generating the system call argument without a fixed marker string.

In Example 15, the subject matter of Examples 1-14 includes, wherein the instrumentation data comprise file access data.

In Example 16, the subject matter of Examples 1-15 includes, wherein the instrumentation data comprise network traffic data.

In Example 17, the subject matter of Examples 1-16 includes, wherein the instrumentation data comprise operating system call data (e.g., system call data).

In Example 18, the subject matter of Examples 1-17 includes, wherein determining to monitor the instance of the application based on the system call comprises: determining that the pseudo-randomly generated identifier is extractable from the system call argument.

Example 19 is a computer-readable medium (e.g., machine-readable medium) storing instructions which, when executed by processing circuitry, cause the processing circuitry to perform operations comprising: determining, by an initialization process, a monitor instance identifier of an application (e.g., an instance of an application), wherein the initialization process initializes monitoring of the application (e.g., the instance of the application); generating, by the initialization process, a system call argument based on a pseudo-randomly generated identifier; making, by the initialization process, a system call comprising the system call argument; determining, by a kernel-space Berkeley packet filter (BPF), to monitor an instance (e.g., the instance) of the application based on the system call; extracting, by the kernel-space BPF, the pseudo-randomly generated identifier from the system call argument to obtain the monitor instance identifier; storing, in a watch list, the monitor instance identifier and the pseudo-randomly generated identifier; and obtaining instrumentation data using the monitor instance identifier and the pseudo-randomly generated identifier.

In Example 20, the subject matter of Example 19 includes, wherein obtaining the instrumentation data using the monitor instance identifier and the pseudo-randomly generated identifier comprises: providing, by the initialization process, the pseudo-randomly generated identifier to a first process associated with the monitor instance identifier; opening, by the first process, an inter-process communication connection to a user-space BPF process; requesting, by the first process, the instrumentation data using the pseudo-randomly generated identifier; and providing, by the user-space BPF process, the instrumentation data to the first process in response to locating the pseudo-randomly generated identifier in the watch list.

In Example 21, the subject matter of Example 20 includes, the operations further comprising: outputting the instrumentation data obtained by the first process.

In Example 22, the subject matter of Examples 20-21 includes, wherein the first process resides in the application (e.g. the instance of the application) in which the initialization process resides.

In Example 23, the subject matter of Examples 20-22 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process is receiving a given request associated with the pseudo-randomly generated identifier; and providing the instrumentation data to the first process in response to determining that the user-space BPF process is receiving the given request associated with the pseudo-randomly generated identifier.

In Example 24, the subject matter of Example 23 includes, the operations further comprising: forgoing providing the instrumentation data to the first process in response to determining that the user-space BPF process is receiving a subsequent request associated with the pseudo-randomly generated identifier, wherein the subsequent request is received after the given request.

In Example 25, the subject matter of Examples 20-24 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process has received one or more prior requests associated with the pseudo-randomly generated identifier and whether the instrumentation data have previously been provided responsive to at least one of the one or more prior requests; and performing at least one of (i) providing the instrumentation data to the first process in response to determining that the one or more prior requests do not exist or that the instrumentation data have not previously been provided responsive to each and every one of the one or more prior requests, or (ii) forgoing providing the instrumentation data to the first process in response to determining that the instrumentation data have previously been provided responsive to the at least one of the one or more prior requests.

In Example 26, the subject matter of Examples 19-25 includes, wherein the pseudo-randomly generated identifier comprises a universally unique identifier (UUID).

In Example 27, the subject matter of Examples 19-26 includes, wherein the application (e.g. the instance of the application) comprises a container.

In Example 28, the subject matter of Examples 19-27 includes, wherein the application is managed by an application management architecture, wherein the application management architecture comprises Docker, Docker Compose, Docker Swarm or Kubernetes.

In Example 29, the subject matter of Examples 19-28 includes, wherein the application is managed by an application management architecture, wherein the application management architecture comprises Kubernetes, wherein the initialization process is attached to the application via a mutating webhook.

In Example 30, the subject matter of Examples 19-29 includes, wherein the system call argument comprises a pathname, wherein the system call comprises a read-mode open system call to open a path associated with the pathname.

In Example 31, the subject matter of Examples 19-30 includes, wherein generating the system call argument comprises generating the system call argument with a fixed marker string.

In Example 32, the subject matter of Examples 19-31 includes, wherein generating the system call argument comprises generating the system call argument without a fixed marker string.

In Example 33, the subject matter of Examples 19-32 includes, wherein the instrumentation data comprise file access data.

In Example 34, the subject matter of Examples 19-33 includes, wherein the instrumentation data comprise network traffic data.

In Example 35, the subject matter of Examples 19-34 includes, wherein the instrumentation data comprise operating system call data (e.g., system call data).

In Example 36, the subject matter of Examples 19-35 includes, wherein determining to monitor the instance of the application based on the system call comprises: determining that the pseudo-randomly generated identifier is extractable from the system call argument.

Example 37 is a system comprising: processing circuitry; and a memory subsystem storing instructions which, when executed by the processing circuitry, cause the processing circuitry to perform operations comprising: determining, by an initialization process, a monitor instance identifier of an application (e.g., an instance of an application), wherein the initialization process initializes monitoring of the application (e.g., the instance of the application); generating, by the initialization process, a system call argument based on a pseudo-randomly generated identifier; making, by the initialization process, a system call comprising the system call argument; determining, by a kernel-space Berkeley packet filter (BPF), to monitor an instance (e.g., the instance) of the application based on the system call; extracting, by the kernel-space BPF, the pseudo-randomly generated identifier from the system call argument to obtain the monitor instance identifier; storing, in a watch list, the monitor instance identifier and the pseudo-randomly generated identifier; and obtaining instrumentation data using the monitor instance identifier and the pseudo-randomly generated identifier.

In Example 38, the subject matter of Example 37 includes, wherein obtaining the instrumentation data using the monitor instance identifier and the pseudo-randomly generated identifier comprises: providing, by the initialization process, the pseudo-randomly generated identifier to a first process associated with the monitor instance identifier; opening, by the first process, an inter-process communication connection to a user-space BPF process; requesting, by the first process, the instrumentation data using the pseudo-randomly generated identifier; and providing, by the user-space BPF process, the instrumentation data to the first process in response to locating the pseudo-randomly generated identifier in the watch list.

In Example 39, the subject matter of Example 38 includes, the operations further comprising: outputting the instrumentation data obtained by the first process.

In Example 40, the subject matter of Examples 38-39 includes, wherein the first process resides in the application (e.g. the instance of the application) in which the initialization process resides.

In Example 41, the subject matter of Examples 38-40 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process is receiving a given request associated with the pseudo-randomly generated identifier; and providing the instrumentation data to the first process in response to determining that the user-space BPF process is receiving the given request associated with the pseudo-randomly generated identifier.

In Example 42, the subject matter of Example 41 includes, the operations further comprising: forgoing providing the instrumentation data to the first process in response to determining that the user-space BPF process is receiving a subsequent request associated with the pseudo-randomly generated identifier, wherein the subsequent request is received after the given request.

In Example 43, the subject matter of Examples 38-42 includes, wherein providing, by the user-space BPF process, the instrumentation data to the first process in response to locating the pseudo-randomly generated identifier in the watch list comprises: verifying, by the user-space BPF process, that the pseudo-randomly generated identifier is in the watch list; determining whether the user-space BPF process has received one or more prior requests associated with the pseudo-randomly generated identifier and whether the instrumentation data have previously been provided responsive to at least one of the one or more prior requests; and performing at least one of (i) providing the instrumentation data to the first process in response to determining that the one or more prior requests do not exist or that the instrumentation data have not previously been provided responsive to each and every one of the one or more prior requests, or (ii) forgoing providing the instrumentation data to the first process in response to determining that the instrumentation data have previously been provided responsive to the at least one of the one or more prior requests.

In Example 44, the subject matter of Examples 37-43 includes, wherein the pseudo-randomly generated identifier comprises a universally unique identifier (UUID).

In Example 45, the subject matter of Examples 37-44 includes, wherein the application (e.g. the instance of the application) comprises a container.

In Example 46, the subject matter of Examples 37-45 includes, wherein the application is managed by an application management architecture, wherein the application management architecture comprises Docker, Docker Compose, Docker Swarm or Kubernetes.

In Example 47, the subject matter of Examples 37-46 includes, wherein the application is managed by an application management architecture, wherein the application management architecture comprises Kubernetes, wherein the initialization process is attached to the application via a mutating webhook.

In Example 48, the subject matter of Examples 37-47 includes, wherein the system call argument comprises a pathname, wherein the system call comprises a read-mode open system call to open a path associated with the pathname.

In Example 49, the subject matter of Examples 37-48 includes, wherein generating the system call argument comprises generating the system call argument with a fixed marker string.

In Example 50, the subject matter of Examples 37-49 includes, wherein generating the system call argument comprises generating the system call argument without a fixed marker string.

In Example 51, the subject matter of Examples 37-50 includes, wherein the instrumentation data comprise file access data.

In Example 52, the subject matter of Examples 37-51 includes, wherein the instrumentation data comprise network traffic data.

In Example 53, the subject matter of Examples 37-52 includes, wherein the instrumentation data comprise operating system call data (e.g., system call data).

In Example 54, the subject matter of Examples 37-53 includes, wherein determining to monitor the instance of the application based on the system call comprises: determining that the pseudo-randomly generated identifier is extractable from the system call argument.

Example 55 is a computer-implemented (e.g., machine-implemented) method comprising: determining whether one or more file systems associated with an application allow for modification of a file access time of an associated file and whether a kernel updates, in at least one case, the file access time upon accessing the associated file, wherein the associated file is at least one file managed by the one or more file systems; determining files accessed by the application using a technique selected based on whether the one or more file systems allow for modification of the file access time or whether the kernel updates, in the at least one case, the file access time upon accessing the associated file; and providing an output representing the files accessed by the application.

In Example 56, the subject matter of Example 55 includes, wherein determining the files accessed by the application using the technique comprises: in response to determining that the one or more file systems allow for modification of the file access time and that the kernel updates, in the at least one case, the file access time upon accessing the associated file: determining the files accessed by the application based on a set of file access times.

In Example 57, the subject matter of Examples 55-56 includes, wherein determining the files accessed by the application using the technique comprises: in response to determining that the one or more file systems do not allow for modification of the file access time or that the kernel never updates the file access time upon accessing the associated file: determining the files accessed by the application without using a file access time field.

In Example 58, the subject matter of Example 57 includes, wherein determining the files accessed by the application without using the access time field (e.g., the file access time field) comprises determining the files accessed by the application using Berkeley packet filters (BPF) implemented at an operating system kernel.

In Example 59, the subject matter of Example 58 includes, wherein determining the files accessed by the application using the BPF comprises: obtaining, using the BPF, a system call by the operating system kernel; matching the system call to the application by the operating system kernel; and recording files accessed by the system call in response to matching the system call to the application.

In Example 60, the subject matter of Examples 55-59 includes, wherein determining whether the one or more file systems allow for modification of the file access time and whether the kernel updates, in the at least one case, the file access time upon accessing the associated file is based on an application manifest.

In Example 61, the subject matter of Example 60 includes, wherein the application manifest comprises at least one of a Kubernetes manifest or a Docker Compose file.

In Example 62, the subject matter of Examples 55-61 includes, wherein determining whether the one or more file systems allow for modification of the file access time comprises attempting to adjust an initialization time of the associated file.

In Example 63, the subject matter of Example 62 includes, wherein determining whether the kernel updates, in the at least one case, the file access time upon accessing the associated file comprises: opening the associated file for reading, and requesting a non-zero-sized file read (e.g., making a non-zero-sized file read request); determine (e.g., determining) whether the file access time of the associated file is updated in response to the file read request; and determining that the kernel updates, in the at least one case, the file access time upon accessing the associated file in response to the file access time of the associated file being updated in response to the file read request.

In Example 64, the subject matter of Examples 55-63 includes, wherein determining whether the one or more file systems allow for modification of the file access time comprises determining whether the one or more file systems are read-only.

Example 65 is a computer-readable medium (e.g., machine-readable medium) storing instructions which, when executed by processing circuitry, cause the processing circuitry to perform operations comprising: determining whether one or more file systems associated with an application allow for modification of a file access time of an associated file and whether a kernel updates, in at least one case, the file access time upon accessing the associated file, wherein the associated file is at least one file managed by the one or more file systems; determining files accessed by the application using a technique selected based on whether the one or more file systems allow for modification of the file access time or whether the kernel updates, in the at least one case, the file access time upon accessing the associated file; and providing an output representing the files accessed by the application.

In Example 66, the subject matter of Example 65 includes, wherein determining the files accessed by the application using the technique comprises: in response to determining that the one or more file systems allow for modification of the file access time and that the kernel updates, in the at least one case, the file access time upon accessing the associated file: determining the files accessed by the application based on a set of file access times.

In Example 67, the subject matter of Examples 65-66 includes, wherein determining the files accessed by the application using the technique comprises: in response to determining that the one or more file systems do not allow for modification of the file access time or that the kernel never updates the file access time upon accessing the associated file: determining the files accessed by the application without using a file access time field.

In Example 68, the subject matter of Example 67 includes, wherein determining the files accessed by the application without using the access time field (e.g., the file access time field) comprises determining the files accessed by the application using Berkeley packet filters (BPF) implemented at an operating system kernel.

In Example 69, the subject matter of Example 68 includes, wherein determining the files accessed by the application using the BPF comprises: obtaining, using the BPF, a system call by the operating system kernel; matching the system call to the application by the operating system kernel; and recording files accessed by the system call in response to matching the system call to the application.

In Example 70, the subject matter of Examples 65-69 includes, wherein determining whether the one or more file systems allow for modification of the file access time and whether the kernel updates, in the at least one case, the file access time upon accessing the associated file is based on an application manifest.

In Example 71, the subject matter of Example 70 includes, wherein the application manifest comprises at least one of a Kubernetes manifest or a Docker Compose file.

In Example 72, the subject matter of Examples 65-71 includes, wherein determining whether the one or more file systems allow for modification of the file access time comprises attempting to adjust an initialization time of the associated file.

In Example 73, the subject matter of Example 72 includes, wherein determining whether the kernel updates, in the at least one case, the file access time upon accessing the associated file comprises: opening the associated file for reading, and requesting a non-zero-sized file read (e.g., making a non-zero-sized file read request); determine (e.g., determining) whether the file access time of the associated file is updated in response to the file read request; and determining that the kernel updates, in the at least one case, the file access time upon accessing the associated file in response to the file access time of the associated file being updated in response to the file read request.

In Example 74, the subject matter of Examples 65-73 includes, wherein determining whether the one or more file systems allow for modification of the file access time comprises determining whether the one or more file systems are read-only.

Example 75 is a system comprising: processing circuitry; and a memory subsystem storing instructions which, when executed by the processing circuitry, cause the processing circuitry to perform operations comprising: determining whether one or more file systems associated with an application allow for modification of a file access time of an associated file and whether a kernel updates, in at least one case, the file access time upon accessing the associated file, wherein the associated file is at least one file managed by the one or more file systems; determining files accessed by the application using a technique selected based on whether the one or more file systems allow for modification of the file access time or whether the kernel updates, in the at least one case, the file access time upon accessing the associated file; and providing an output representing the files accessed by the application.

In Example 76, the subject matter of Example 75 includes, wherein determining the files accessed by the application using the technique comprises: in response to determining that the one or more file systems allow for modification of the file access time and that the kernel updates, in the at least one case, the file access time upon accessing the associated file: determining the files accessed by the application based on a set of file access times.

In Example 77, the subject matter of Examples 75-76 includes, wherein determining the files accessed by the application using the technique comprises: in response to determining that the one or more file systems do not allow for modification of the file access time or that the kernel never updates the file access time upon accessing the associated file: determining the files accessed by the application without using a file access time field.

In Example 78, the subject matter of Example 77 includes, wherein determining the files accessed by the application without using the access time field (e.g., the file access time field) comprises determining the files accessed by the application using Berkeley packet filters (BPF) implemented at an operating system kernel.

In Example 79, the subject matter of Example 78 includes, wherein determining the files accessed by the application using the BPF comprises: obtaining, using the BPF, a system call by the operating system kernel; matching the system call to the application by the operating system kernel; and recording files accessed by the system call in response to matching the system call to the application.

In Example 80, the subject matter of Examples 75-79 includes, wherein determining whether the one or more file systems allow for modification of the file access time and whether the kernel updates, in the at least one case, the file access time upon accessing the associated file is based on an application manifest.

In Example 81, the subject matter of Example 80 includes, wherein the application manifest comprises at least one of a Kubernetes manifest or a Docker Compose file.

In Example 82, the subject matter of Examples 75-81 includes, wherein determining whether the one or more file systems allow for modification of the file access time comprises attempting to adjust an initialization time of the associated file.

In Example 83, the subject matter of Example 82 includes, wherein determining whether the kernel updates, in the at least one case, the file access time upon accessing the associated file comprises: opening the associated file for reading, and requesting a non-zero-sized file read (e.g., making a non-zero-sized file read request); determine (e.g., determining) whether the file access time of the associated file is updated in response to the file read request; and determining that the kernel updates, in the at least one case, the file access time upon accessing the associated file in response to the file access time of the associated file being updated in response to the file read request.

In Example 84, the subject matter of Examples 75-83 includes, wherein determining whether the one or more file systems allow for modification of the file access time comprises determining whether the one or more file systems are read-only.

Example 85 is at least one machine-readable medium including instructions that, when executed by processing circuitry, cause the processing circuitry to perform operations to implement any of Examples 1-84.

Example 86 is an apparatus comprising means to implement any of Examples 1-84.

Example 87 is a system to implement any of Examples 1-84.

Example 88 is a method to implement any of Examples 1-84.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method for improving computer security by monitoring application behavior, the method comprising:
    determining whether one or more file systems associated with an application allow for modification of a file access time of an associated file and whether a kernel updates, in at least one case, the file access time upon accessing the associated file, wherein the associated file is at least one file managed by the one or more file systems, wherein determining whether the one or more file systems allow for modification of the file access time comprises attempting to adjust an initialization time of the associated file, wherein determining whether the kernel updates, in the at least one case, the file access time upon accessing the associated file comprises:
  opening the associated file for reading, and making a non-zero-sized file read request;
  determining whether the file access time of the associated file is updated in response to the file read request; and
  determining that the kernel updates, in the at least one case, the file access time upon accessing the associated file in response to the file access time of the associated file being updated in response to the file read request;
determining files accessed by the application using a technique selected based on whether the one or more file systems allow for modification of the file access time or whether the kernel updates, in the at least one case, the file access time upon accessing the associated file, wherein the technique is selected from a set comprising at least determining the files accessed by the application based on a file access time field; and
providing an output representing the files accessed by the application, wherein the output enables improving computer security based on the files.

2. The method of claim 1, wherein determining the files accessed by the application using the technique comprises:
  in response to determining that the one or more file systems allow for modification of the file access time and that the kernel updates, in the at least one case, the file access time upon accessing the associated file: determining the files accessed by the application based on the file access time field.

3. The method of claim 1, wherein determining the files accessed by the application using the technique comprises:
  in response to determining that the one or more file systems do not allow for modification of the file access time or that the kernel never updates the file access time upon accessing the associated file: determining the files accessed by the application without using the file access time field.

4. The method of claim 3, wherein determining the files accessed by the application without using the file access time field comprises determining the files accessed by the application using Berkeley packet filters (BPF) implemented at an operating system kernel.

5. The method of claim 4, wherein determining the files accessed by the application using the BPF comprises:
  obtaining, using the BPF, a system call by the operating system kernel;
  matching the system call to the application by the operating system kernel; and
  recording files accessed by the system call in response to matching the system call to the application.

6. The method of claim 1, wherein determining whether the one or more file systems allow for modification of the file access time and whether the kernel updates, in the at least one case, the file access time upon accessing the associated file is based on an application manifest.

7. The method of claim 6, wherein the application manifest comprises at least one of a Kubernetes manifest or a Docker Compose file.

8. The method of claim 1, wherein determining whether the one or more file systems allow for modification of the file access time comprises determining whether the one or more file systems are read-only.

9. A non-transitory computer-readable medium for improving computer security by monitoring application behavior, the non-transitory computer-readable medium storing instructions which, when executed by processing circuitry, cause the processing circuitry to perform operations comprising:
  determining whether one or more file systems associated with an application allow for modification of a file access time of an associated file and whether a kernel updates, in at least one case, the file access time upon accessing the associated file, wherein the associated file is at least one file managed by the one or more file systems, wherein determining whether the one or more file systems allow for modification of the file access time comprises attempting to adjust an initialization time of the associated file, wherein determining whether the kernel updates, in the at least one case, the file access time upon accessing the associated file comprises:
    opening the associated file for reading, and making a non-zero-sized file read request;
    determining whether the file access time of the associated file is updated in response to the file read request; and
    determining that the kernel updates, in the at least one case, the file access time upon accessing the associated file in response to the file access time of the associated file being updated in response to the file read request;
  determining files accessed by the application using a technique selected based on whether the one or more file systems allow for modification of the file access time or whether the kernel updates, in the at least one case, the file access time upon accessing the associated file, wherein the technique is selected from a set comprising at least determining the files accessed by the application based on a file access time field; and
  providing an output representing the files accessed by the application, wherein the output enables improving computer security based on the files.

10. The non-transitory computer-readable medium of claim 9, wherein determining the files accessed by the application using the technique comprises:
  in response to determining that the one or more file systems allow for modification of the file access time and that the kernel updates, in the at least one case, the file access time upon accessing the associated file: determining the files accessed by the application based on the file access time field.

11. The non-transitory computer-readable medium of claim 9, wherein determining the files accessed by the application using the technique comprises:
  in response to determining that the one or more file systems do not allow for modification of the file access time or that the kernel never updates the file access time upon accessing the associated file: determining the files accessed by the application without using the file access time field.

12. The non-transitory computer-readable medium of claim 11, wherein determining the files accessed by the application without using the file access time field comprises determining the files accessed by the application using Berkeley packet filters (BPF) implemented at an operating system kernel.

13. The non-transitory computer-readable medium of claim 12, wherein determining the files accessed by the application using the BPF comprises:
  obtaining, using the BPF, a system call by the operating system kernel;

matching the system call to the application by the operating system kernel; and recording files accessed by the system call in response to matching the system call to the application.

14. The non-transitory computer-readable medium of claim 9, wherein determining whether the one or more file systems allow for modification of the file access time and whether the kernel updates, in the at least one case, the file access time upon accessing the associated file is based on an application manifest.

15. The non-transitory computer-readable medium of claim 14, wherein the application manifest comprises at least one of a Kubernetes manifest or a Docker Compose file.

16. The non-transitory computer-readable medium of claim 9, wherein determining whether the one or more file systems allow for modification of the file access time comprises determining whether the one or more file systems are read-only.

17. A system for improving computer security by monitoring application behavior, the system comprising:

processing circuitry; and a memory subsystem storing instructions which, when executed by the processing circuitry, cause the processing circuitry to perform operations comprising:

determining whether one or more file systems associated with an application allow for modification of a file access time of an associated file and whether a kernel updates, in at least one case, the file access time upon accessing the associated file, wherein the associated file is at least one file managed by the one or more file systems, wherein determining whether the one or more file systems allow for modification of the file access time comprises attempting to adjust an initialization time of the associated file, wherein determining whether the kernel updates, in the at least one case, the file access time upon accessing the associated file comprises:

opening the associated file for reading, and making a non-zero-sized file read request;

determining whether the file access time of the associated file is updated in response to the file read request; and determining that the kernel updates, in the at least one case, the file access time upon accessing the associated file in response to the file access time of the associated file being updated in response to the file read request;

determining files accessed by the application using a technique selected based on whether the one or more file systems allow for modification of the file access time or whether the kernel updates, in the at least one case, the file access time upon accessing the associated file, wherein the technique is selected from a set comprising at least determining the files accessed by the application based on a file access time field; and providing an output representing the files accessed by the application, wherein the output enables improving computer security based on the files.

18. The system of claim 17, wherein determining the files accessed by the application using the technique comprises:

in response to determining that the one or more file systems allow for modification of the file access time and that the kernel updates, in the at least one case, the file access time upon accessing the associated file: determining the files accessed by the application based on the file access time field.

19. The system of claim 17, wherein determining the files accessed by the application using the technique comprises:

in response to determining that the one or more file systems do not allow for modification of the file access time or that the kernel never updates the file access time upon accessing the associated file: determining the files accessed by the application without using the file access time field.

20. The system of claim 19, wherein determining the files accessed by the application without using the file access time field comprises determining the files accessed by the application using Berkeley packet filters (BPF) implemented at an operating system kernel.

21. The system of claim 20, wherein determining the files accessed by the application using the BPF comprises:

obtaining, using the BPF, a system call by the operating system kernel;

matching the system call to the application by the operating system kernel; and recording files accessed by the system call in response to matching the system call to the application.

22. The system of claim 17, wherein determining whether the one or more file systems allow for modification of the file access time and whether the kernel updates, in the at least one case, the file access time upon accessing the associated file is based on an application manifest.

23. The system of claim 22, wherein the application manifest comprises at least one of a Kubernetes manifest or a Docker Compose file.

24. The system of claim 17, wherein determining whether the one or more file systems allow for modification of the file access time comprises determining whether the one or more file systems are read-only.

* * * * *